US008452930B2

(12) United States Patent
Mimatsu

(10) Patent No.: US 8,452,930 B2
(45) Date of Patent: May 28, 2013

(54) METHODS AND APPARATUS FOR BACKUP AND RESTORE OF THIN PROVISIONING VOLUME

(75) Inventor: Yasuyuki Mimatsu, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 538 days.

(21) Appl. No.: 12/413,406

(22) Filed: Mar. 27, 2009

(65) Prior Publication Data

US 2010/0250880 A1 Sep. 30, 2010

(51) Int. Cl.
*G06F 12/16* (2006.01)

(52) U.S. Cl.
USPC .......................................... 711/162; 711/161

(58) Field of Classification Search
None
See application file for complete search history.

(56) References Cited

U.S. PATENT DOCUMENTS 6,725,328 B2 4/2004 Kano et al.
2005/0216788 A1* 9/2005 Mani-Meitav et al. ........... 714/6
2008/0195827 A1* 8/2008 Saika ............................ 711/162

OTHER PUBLICATIONS

R. Cardona, "Applications of the VMware Open VMDK Specification", http://download3.vmware.com/vmworld/2006/dvt9699.pdf, VMWorld 2006, Nov. 2006, retrieved on Mar. 26, 2009.

Microsoft Windows, "Virtual Hard Disk Image Format Specification", http://download.microsoft.com/download/f/f/e/ffef50a5-07dd-4cf8-aaa3-442c0673a029/Virtual%20Hard%20Disk%20Format%20Spec_10_18_06.doc, Version 1.0, Oct. 11, 2006, retrieved on Mar. 26, 2009.

VMWare, XenSource, "Open Virtual Machine Format Specification (OVF)", Version 0.9, http://www.vmware.com/pdf/ovf_spec_draft.pdf, Sep. 7, 2007, retrieved on Mar. 26, 2009.

European Search Report dated Apr. 5, 2010 Issued in Corresponding Europe Patent Application 09252098.0-2224.

* cited by examiner

*Primary Examiner* — Than Nguyen
(74) *Attorney, Agent, or Firm* — Procopio, Cory, Hargreaves & Savitch, LLP

(57) ABSTRACT

Methods and apparatuses for backing up virtual volumes effectively by eliminating transfer and preservation of parts of virtual volumes, which contain no data. By representing virtual volumes as virtual files in a virtual file system, it is thereby possible to avoid needlessly backing up empty data space in the virtual volume. In one implementation, a storage system includes multiple virtual volumes and a virtual file system as well as a storage system control module. Each virtual volume in the multiple virtual volumes is represented as a virtual file within the virtual file system with each virtual file representing data actually stored within the virtual volume; and the storage system control module facilitates backing up a selected virtual volume, the operations involving accessing the virtual file system on the storage system; and reading the virtual file corresponding to the selected virtual volume.

21 Claims, 29 Drawing Sheets

10205

| File handle (80001) | Header image (80002) | BAT Image (80003) | Block header image (80004) | Footer image (80005) |
|---|---|---|---|---|
| 0 | Header image Of virtual file 'DB Vol" | Offset of block #1 | Block header #1 | Footer image of Virtual file 'DB Vol" |
| | | Offset of block #2 | Block header #2 | |
| | | - | - | |
| | | Offset of block #4 | Block header #4 | |
| | | ⋮ | ⋮ | |
| ... | | | | |

| LBA | Volume block # | File block # |
|---|---|---|
| 0 | 0 | 0 |
| 1 | 0 | 0 |
| 2 | 1 | 0 |
| 3 | 1 | 0 |
| 4 | 2 | 1 |
| 5 | 2 | 1 |
| 6 | 3 | 1 |
| 7 | 3 | 1 |

10202

50001 | 50002

| Disk block size | Free blocks |
|---|---|
| 512B | Disk1: LBA0,<br>Disk1: LBA1,<br>Disk1: LBA2,<br>⋮ |
| 64KB | Disk2: LBA2048-2175,<br>Disk2: LBA2176-2303,<br>⋮ |
| ... | |

| Virtual vol. ID (60001) | Volume size (60002) | Disk block size (60003) | Vol. LBA (60004) | Allocation (60005) | Volume block # (60006) | File block # (60007) |
|---|---|---|---|---|---|---|
| 0 | 1GB | 512B | 0 | Disk1: LBA1024 | 0 | 0 |
| | | | 1 | Disk2: LBA0 | 1 | 0 |
| | | | 2 | - | 2 | 1 |
| | | | 3 | Disk1: LBA1025 | 3 | 1 |
| | | | ⋮ | ⋮ | ⋮ | ⋮ |
| 1 | 2GB | 64KB | 0 | Disk1: LBA4096 | 0 | 0 |
| | | | 1 | Disk1: LBA4097 | 0 | 0 |
| | | | ⋮ | ⋮ | ⋮ | ⋮ |
| ... | | | | | | |

| Virtual vol. ID (70001) | File handle (70002) | File State (70003) | Original virtual file name (70004) | Current virtual file name (70005) | Virtual file size (70006) | # of used file blocks (70007) | BAT size (70008) | File block size (70009) | Block header size (70010) | Block list size (70011) |
|---|---|---|---|---|---|---|---|---|---|---|
| 0 | 0 | backup | "DB vol" | "DB vol – backup" | 1.6GB | 1M | 4MB | 1KB | 512B | 1.1GB |
| 1 | 1 | normal | "mailbox" | "mailbox" | - | - | 8MB | 16MB | 4KB | - |
| ... | | | | | | | | | | |

| File handle (80001) | Header image (80002) | BAT Image (80003) | Block header image (80004) | Footer image (80005) |
| --- | --- | --- | --- | --- |
| 0 | Header image Of virtual file 'DB Vol" | Offset of block #1 | Block header #1 | Footer image of Virtual file 'DB Vol" |
| | | Offset of block #2 | Block header #2 | |
| | | - | - | |
| | | Offset of block #4 | Block header #4 | |
| | | ⋮ | ⋮ | |
| ... | | | | |

| Default disk block size (90001) | Default file block size (90002) | Virtual volume sector size (90003) | Virtual file sector size (90004) | Virtual file header size (90005) | Virtual file footer size (90006) | BAT entry size (90007) |
|---|---|---|---|---|---|---|
| 64KB | 1KB | 512B | 512B | 1KB | 512B | 4B |

Fig. 9

100007 Process flow of file operation (READDIR)

100007 Process flow of file operation (LOOKUP)

100007 Process flow of file operation (GETATTR)

210005 Process flow of write 1 byte before whole header is written

210007 Process flow of write 1 byte before whole BAT is written

210011 Process flow of write 1 byte before whole footer is written

10203

| Virtual vol. ID (60001) | Volume size (60002) | Disk block size (60003) | Volume LBA (60004) | Allocation (60005) | Write flag (260001) | Snapshot allocation (260002) | Volume block # (60006) | File block # (60007) |
|---|---|---|---|---|---|---|---|---|
| 0 | 1GB | 512B | 0 | Disk1: LBA1024 | - | Disk1: LBA1024 | 0 | 0 |
| | | | 1 | Disk2: LBA1 | T | Disk2: LBA0 | 1 | 0 |
| | | | 2 | Disk2: LBA2 | T | - | 2 | 1 |
| | | | 3 | Disk1: LBA1025 | - | Disk1: LBA1025 | 3 | 1 |
| | | | ⋮ | ⋮ | | ⋮ | ⋮ | ⋮ |
| 1 | 2GB | 64KB | 0 | Disk1: LBA4096 | - | - | 0 | 0 |
| | | | 1 | Disk1: LBA4097 | - | - | 0 | 0 |
| | | | ⋮ | ⋮ | | ⋮ | ⋮ | ⋮ |
| ... | | | | | | | | |

Fig. 26

METHODS AND APPARATUS FOR BACKUP AND RESTORE OF THIN PROVISIONING VOLUME

FIELD OF THE INVENTION

This invention is generally related to methods and apparatuses for managing disk volumes and files in computer storage systems, and particularly to methods and apparatuses which perform backup and restore of thin provisioning volumes by exposing them as portable virtual disk files.

DESCRIPTION OF THE RELATED ART

Some modern computer storage systems are able to provide a 'virtual volume' or a 'thin provisioning volume' which is recognized as a fixed-capacity disk volume by host computers, but which has its actual storage capacity dynamically allocated when data is written to the volume. The unit of storage capacity allocation is a 'disk block', which is a segment of one or more disk drives in the storage system. The storage system manages the mapping between every part of the virtual volumes and the disk blocks. When a host computer reads a part of the virtual volume and if no disk block has yet been allocated to that part, the storage system returns '0's as if the part is filled by '0's. Because disk blocks are allocated as needed, the capacity of disk drives can be used effectively by eliminating the need to allocate disk capacity to data-free areas of storage volumes. Furthermore, the capacity of such storage system may be flexibly shared by multiple virtual volumes. The administrator does not have to precisely predict the necessary capacity for each volume at the time the volume is created and may thereby create very large virtual volumes, since virtual volumes consume capacity not based on their declared size but rather according to the capacity actually used to store data. The fundamental technological concepts behind the dynamic capacity allocation are disclosed in U.S. Pat. No. 6,725,328, incorporated herein by reference in its entirety.

Another technology, which can be used to implement thin provisioning is a 'virtual disk' often accessed by a virtual machine. The virtual disk is a file which contains all blocks in a disk volume recognized by the virtual machine. Some of the virtual disk file formats can contain only the used portion of a disk volume. One example of the virtual disk file format is disclosed in "Applications of the VMware Open VMDK Specification", http://download3.vmware.com/vmworld/2006/dvt9699.pdf, incorporated herein by reference in its entirety. Another example is disclosed in "Virtual Hard Disk Image Format Specification", http://download.microsoft.com/download/f/f/e/ffef50a5-07dd-4cf8-aaa3-442c0673a029/Virtual%20Hard%20Disk%20Format%20Spec_10_18_06.doc, incorporated herein by reference in its entirety. Efforts are being made to achieve the interoperability of virtual disk files by defining a standard format disclosed in "Open Virtual Machine Format Specification", http://www.vmware.com/pdf/ovf_spec_draft.pdf, incorporated herein by reference in its entirety.

To backup data stored in a disk volume in a form of a large number of small data files, a host computer (backup server) performs a volume-based backup operation. In other words, the host computer simply reads the entire volume image to eliminate the overhead of file system process for each file. If a host computer performs the volume-based backup of a virtual volume, it has to read the entire volume including parts which have no disk blocks assigned to them, because the host computer does not recognize which parts of the volume have assigned disk blocks. As would be appreciated by persons of skill in the art, the transfer and preservation of the parts with no disk blocks assigned constitutes a waste of system resources because such parts contain no data and, therefore, do not need to be backed up. If the size of the unallocated parts is large, significant amounts of network bandwidth, backup storage capacity and time are consumed needlessly.

Therefore, there is a need for systems and methods which facilitate backups of virtual volumes effectively by eliminating the transfer and preservation of parts of virtual volumes which contain no data.

SUMMARY OF THE INVENTION

The inventive methodology is directed to methods and systems that substantially obviate one or more of the above and other problems associated with virtual volume backup.

In accordance with one aspect of the present invention, there is provided a storage system including one or more virtual volumes and a virtual file system as well as a storage system control module, a management server, and a backup server. Each virtual volume is represented as a virtual file within the virtual file system with each virtual file representing data actually stored within the virtual volume; and the storage system control module is configured to facilitate operations for backing up a selected virtual volume, the operations including: accessing the virtual file system on the storage system; and reading the virtual file corresponding to the selected virtual volume. The storage system control module is further configured to facilitate operations for restoring a selected virtual volume, the operations involving accessing the virtual file system on the storage system; and creating a virtual file representing the selected virtual volume.

Additional aspects of the present invention include a method performed by a storage system including a storage system control module, one or more virtual volumes and a virtual file system; wherein each virtual volume is represented as a virtual file within the virtual file system. Each virtual file represents data actually stored within the virtual volume; the method comprising performing operations for backing up a selected virtual volume, the operations including accessing the virtual file system on the storage system; reading the virtual file corresponding to the selected virtual volume. The method also includes performing operations for restoring a selected virtual volume, the operations including accessing the virtual file system on the storage system; and creating a virtual file representing the selected virtual volume.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 5 shows an exemplary structure of the disk block table.

FIG. 6 shows an exemplary structure of the virtual volume table.

FIG. 7 shows an exemplary structure of the virtual file table.

FIG. 8 shows an exemplary structure of the file image table.

FIG. 9 shows an exemplary structure of a format table containing system-wide settings.

FIG. 26 shows an exemplary structure of the virtual volume table in the second embodiment.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

First Embodiment

In this embodiment, virtual volumes in the storage system are accessed by an application server through FibreChannel network using SCSI protocol. The location of data in a virtual volume is addressed by Logical Block Address (LBA) which identifies each sector. Virtual files corresponding to the virtual volumes are accessed by a backup server through a local area network (LAN) using NFS protocol. When a virtual file is being read, i.e., the virtual volume is being backed up, the storage system prohibits application servers from writing data to the virtual volume. When a virtual file is being written, i.e., the virtual volume is being restored, the storage system prohibits host computers from reading/writing data from/to the volume. One of the host computers (backup server) not only reads or writes a virtual file, but also manages the state of the virtual file and the virtual volume by sending file operations like GETATTR, CREATE, RENAME, etc.

System Structure

Figure 1:
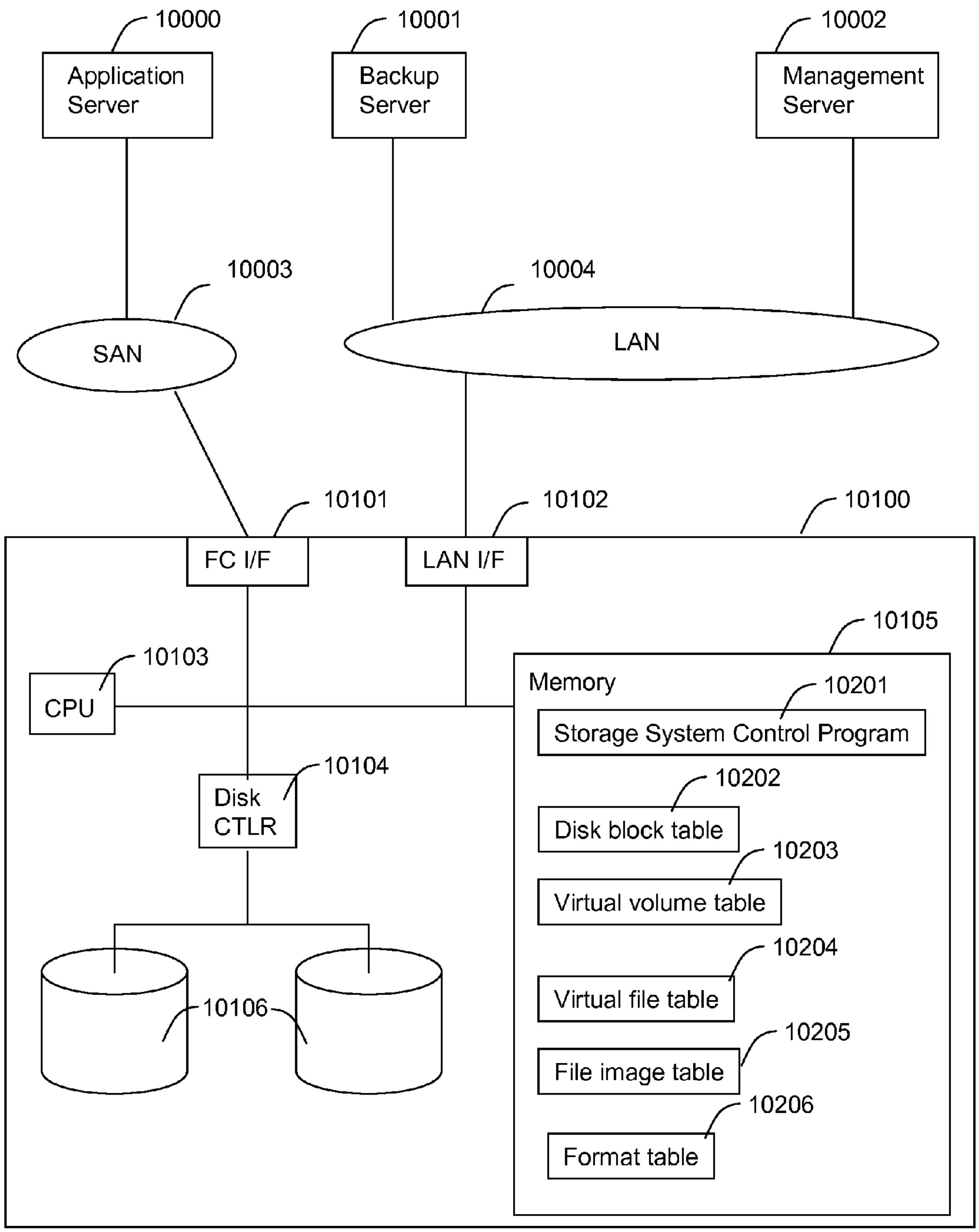
FIG. 1 shows an overview of an example computer system in which the method and apparatus of this invention can be applied.

FIG. 1 shows an overview of an example computer system in which the method and apparatus of this invention can be applied. It includes a storage system 10100, an application server 10000 which is connected to FibreChannel interface of the storage system 10101 through Storage Area Network (SAN) 10003, a backup server 10001, and a management server 10002. The backup server and the management server are connected to the LAN interface 10102 of the storage system through the Local Area Network (LAN) 10004. The backup server accesses the virtual file system exposed by the storage system by sending file operations. The management server provides a user interface to an administrator of the system so that the administrator can create and delete a virtual volume and change any other configurations of the storage system.

Storage system 10100 has disk drives 10106 controlled by disk controller 10104. The capacity of the disk drives is divided into disk blocks which are allocated to virtual volumes. CPU 10103 executes the storage system control program 10201 in memory 10105. The storage system control program processes I/O requests sent from the application server, NFS operations sent from the backup server, and management requests sent from management server. Memory 10105 contains several tables 10202-10206 which contain management information.

Figure 2A:
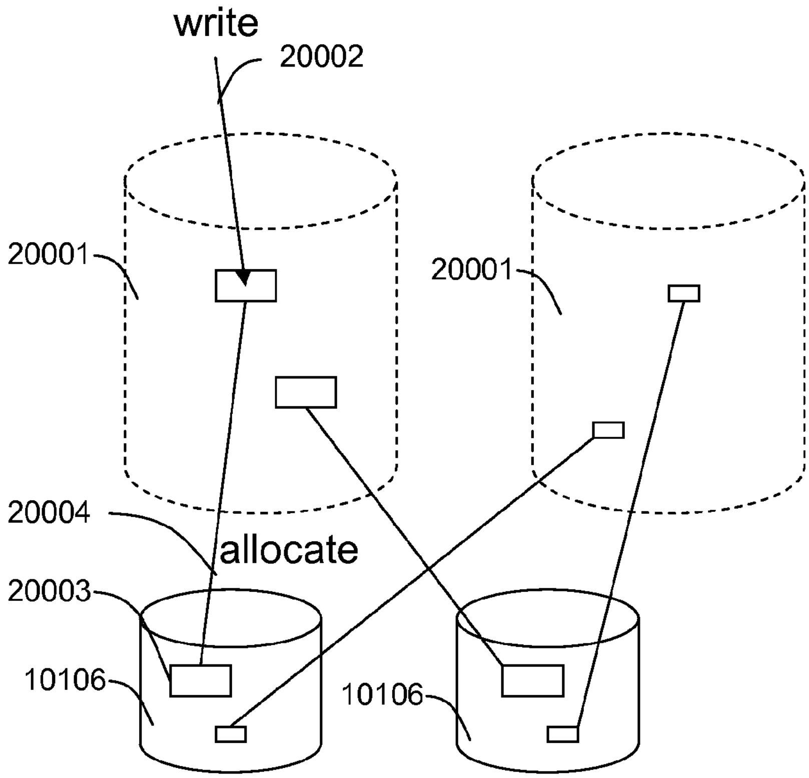
FIGS. 2a and 2b show an illustration of an exemplary embodiment of a virtual volume.
Figure 2B:
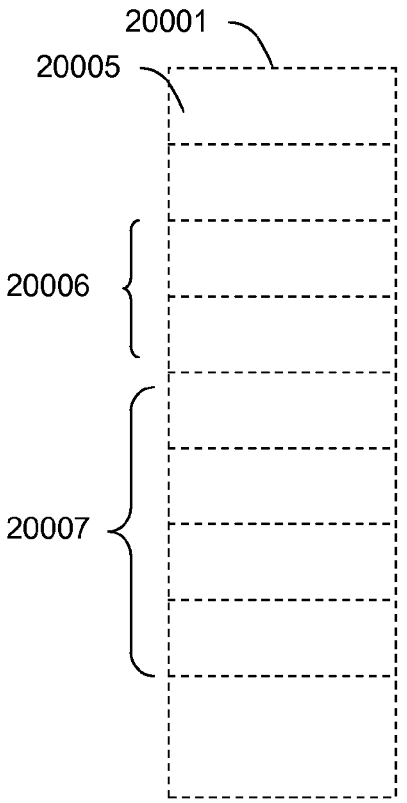

FIGS. 2a and 2b show an illustration of the virtual volume. Virtual volumes 20001 are exposed to the application server as fixed-length volumes but disk blocks 20003 in disk drives 10106 are not allocated to the whole area of the volumes. If data is written to a virtual volume (20002), one or more disk blocks are allocated (20004). In this embodiment, the size of the disk block is constant in a virtual volume but can be different among virtual volumes. As shown in FIG. 2b, the location in a virtual volume is addressed by a LBA assigned for each sector 20005 in the volume. In addition, the location in the volume can be addressed by volume block number which is assigned for each segment 20006 whose size is equal to the size of disk block. The location also can be addressed by file block number which is assigned for each segment 20007 whose size is equal to the size of the file block, which is described below.

Figure 3:
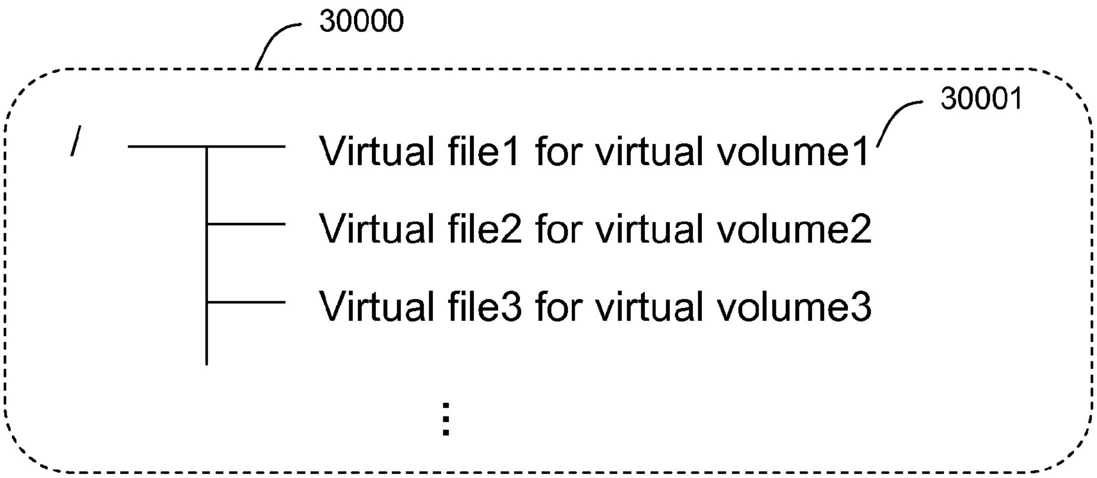
FIG. 3 shows an illustration of an exemplary embodiment of a virtual file system.

FIG. 3 shows an illustration of the virtual file system. The only directory in the virtual file system 30000 is root (/) which contains entries of the virtual files 30001 corresponding to virtual volumes in the storage system. The virtual file system can be accessed by the backup server in NFS protocol.

When a virtual volume is represented by a virtual file, the whole volume is divided into multiple segments ("file blocks") whose size is constant in a virtual file. The size of the file block can be different from the size of the disk block. Also, it can be different among virtual files. A virtual file does not include a file block if no data is stored into the file block.

Figure 4A:
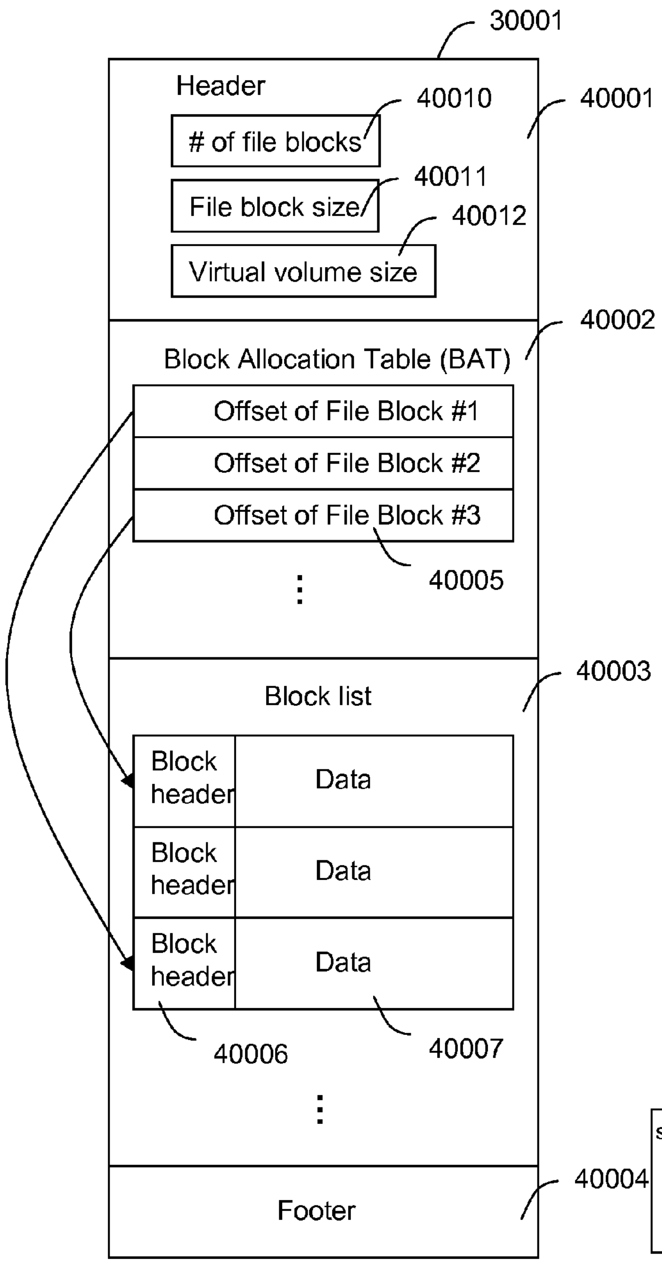
FIGS. 4a and 4b show an exemplary format of a virtual file.
Figure 4B:
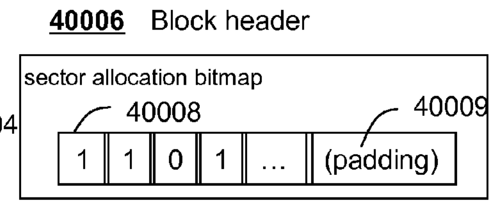

FIGS. 4*a* and 4*b* show an example format of a virtual file. A virtual file 30001 includes four parts: the Header 40001, the Block Allocation Table (BAT) 40002, the Block list 40003, and the Footer 40004. The Header contains some management information of the virtual file including the number of file blocks stored in the virtual file 40010, the size of the file block 40011, and the size of the virtual volume which the virtual file represents 40012. The BAT contains an offset 40005 for each file block contained in the following block list. The offset is byte offset from the beginning of the file and points to the file block header preceding the file block. If a file block is not contained in the file, the offset is marked as invalid. The Block list is a list of file block headers 40006 and file blocks 40007. The details of file block header are shown in FIG. 4*b*. It is a bitmap 40008 which indicates which sector in the file block is valid. For example, if the size of file block and sector is 8 KB and 512 B respectively, the file block can contain eight sectors. However, some sectors may be invalid because no disk block is allocated to the sector in the virtual volume. In one embodiment, each bit in the bitmap indicates the validity of a sector in the file block. The bitmap can be trailed by padding bits 40009 so that the size of block header is aligned to the size of sector.

FIG. 5 shows an example structure of the disk block table 10202. For each disk block size 50001 which the storage system supports, all free disk blocks 50002, i.e., all disk blocks which are not allocated to any virtual volumes, are recorded. If a free disk block is allocated to a virtual volume, the block is removed from this table. The block is recorded in this table again if it is released from the volume.

FIG. 6 shows an example structure of the virtual volume table 10203. For each virtual volume, the table indicates the virtual volume ID 60001, the volume size 60002, and the size of the disk block allocated to the volume 60003. It also contains, for each LBA 60004 in the volume, a disk block allocated to the LBA 60005, the number of volume block which includes the LBA 60006, and the number of file block which includes the LBA 60007.

FIG. 7 shows an example structure of the virtual file table. For each virtual file, the table indicates the ID of the virtual volume which the file represents 70001, the NFS file handle of the file 70002, the state of the file 70003, the original name of the virtual file 70004, the current name of the virtual file 70005, the size of the virtual file 70006, the number of file blocks contained in the file 70007, the size of BAT area in the file 70008, the size of file block 70009, the size of file block header 70010, and the size of block list are in the file 70011. The value of file state can be one of following: normal, backup, restoring, header restored, BAT restored, blocks restored, or restored. The original virtual file name is specified at the time of volume creation or restore of a volume (file creation). The current virtual file name is the original name or the original name trailed by '-backup'. The latter indicates the volume is being backed up or restored.

FIG. 8 shows an example structure of the file image table. For each virtual file, the table indicates its NFS file handle 80001, header image 80002, BAT image 80003, Block header image for each file block number of the virtual volume 80004, and footer image 80005. These image columns 80002-80005 store contents of a virtual file except for the file blocks which are stored in disk blocks instead.

FIG. 9 shows an example structure of a format table containing system-wide settings. The default disk block size 90001 and the default file block size 90002 define the default values of the disk block size of a virtual volume and the default values for the file block size of a virtual file, respectively. The virtual volume sector size 90003 and virtual file sector size 90004 define the sector size of a virtual volume and a virtual file, respectively. The virtual file header size 90005, virtual file footer size 90006, and BAT entry size 90007 contain the definition of the virtual file format. All size values except BAT entry size must be multiples of the virtual volume sector size in this embodiment.

Process Flows

Figure 10:
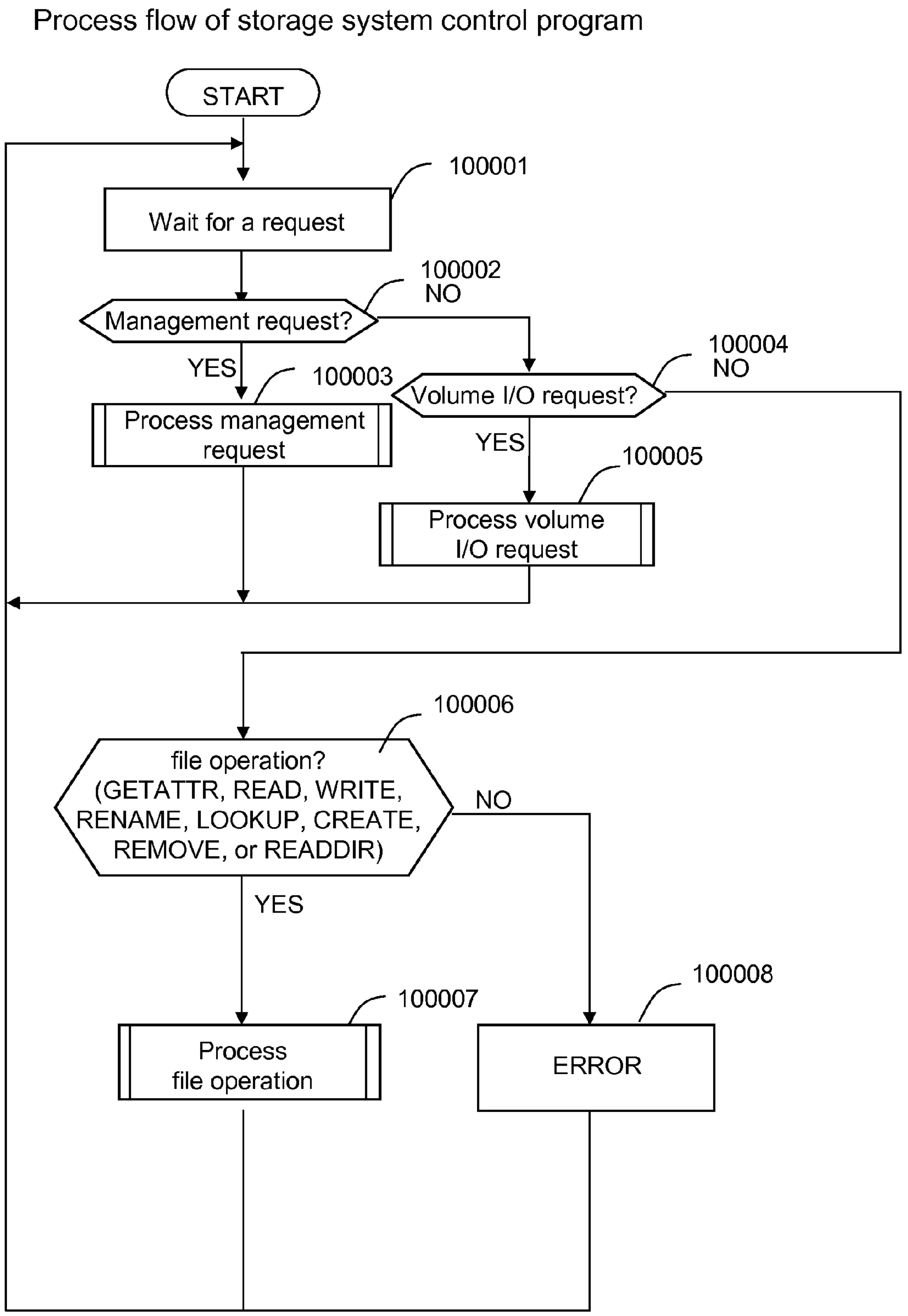
FIG. 10 shows an exemplary process flow of the storage system control program 10201.

FIG. 10 shows the process flow of the storage system control program 10201. The storage system control program receives requests (10001) from the application server, the backup server, or the management server. If it receives a management request (100002) from management server, a volume I/O request (100004) from application server, or a file operation (100006) from the backup server, it processes the request respectively (10003, 10005, or 10007). In this embodiment, it accepts following NFS operations: GETATTR, READ, WRITE, RENAME, LOOKUP, CREATE, REMOVE, and READDIR. If it receives other requests, it returns an error (100008). However, it is possible to accept other requests to transfer other information or return a dummy response to them.

Figure 11:
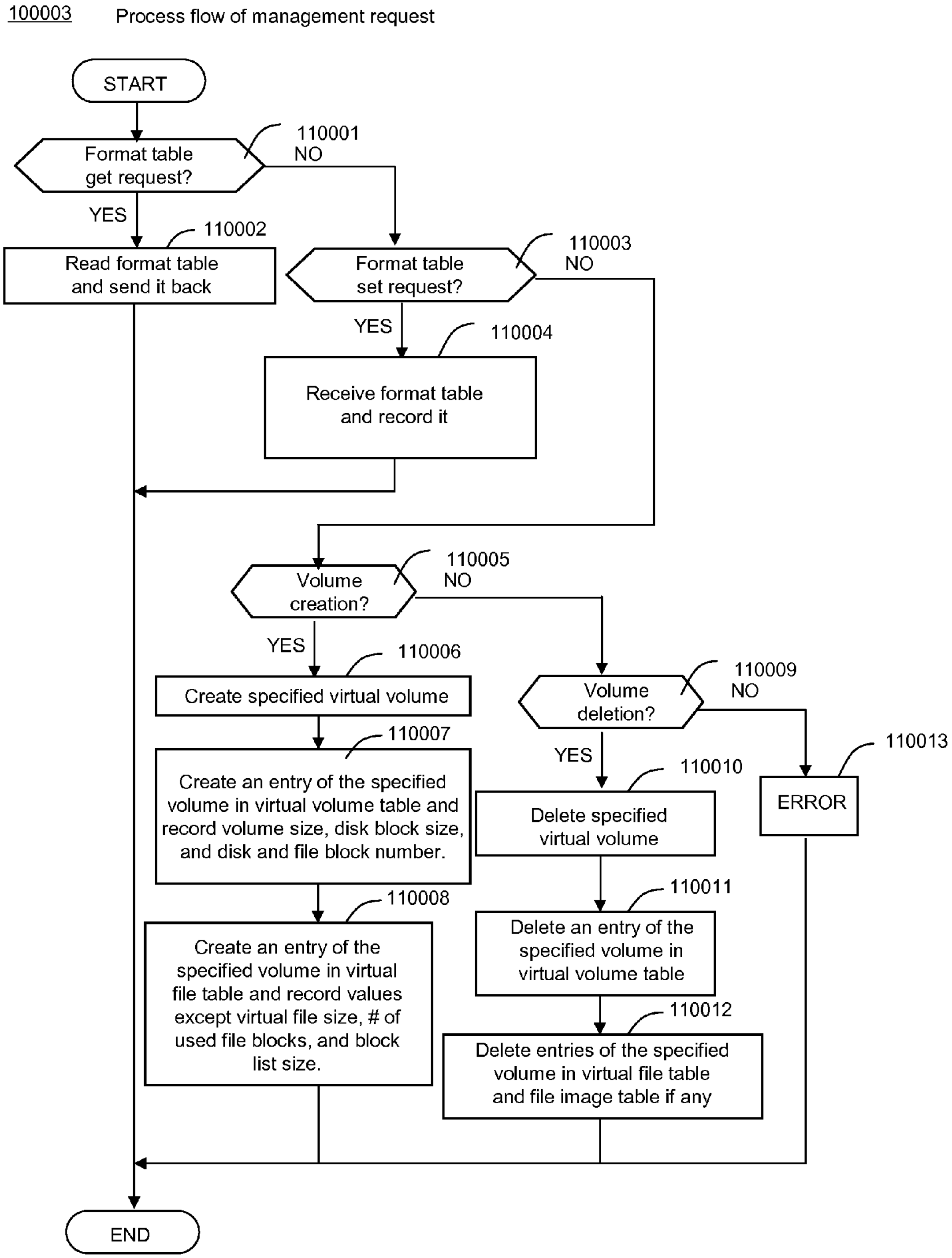
FIG. 11 shows details of the exemplary process flow of the management request.

FIG. 11 shows details of the process flow of the management request (100003). If a received request is a request to get or set values in the format table (110001, 110003), the storage system control program sends or sets the information stored in format table (110002, 110004). If it receives a volume creation request (100005) which specifies the volume size, disk block size of the volume, original name of a virtual file which represents the volume, and file block size, then it creates a virtual volume (110006), assign a virtual volume ID to the volume, creates a file handle to a virtual file which represents the volume, and records them and the information specified in the request into the virtual volume table and the virtual file table (110007, 110008). If the disk block size and/or the file block size are not specified in the request, default values recorded in the format table are used. Initially, all allocation disk blocks 60005 for each LBA in the virtual volume table are marked as invalid. Also, based on the disk block size and the file block size, the disk block number and the file block number are recorded in a virtual volume table for each LBA in the volume. In the virtual file table, the file state and the current virtual file name are set to 'normal' and the value of the original file name, respectively. The BAT size can be calculated as (volume size)*(BAT entry size in format table)/(file block size). Block header size can be calculated as (file block size)/(file sector size in format table) aligned to the file sector size. These values are also recorded in virtual file table. If the storage system control program receives a volume deletion request (110009), it will delete the virtual volume and release all disk blocks allocated to the volume (110010).

It will also delete entries of the volume in the virtual volume table, virtual file table and the file image table (110011, 110012).

Figure 12:
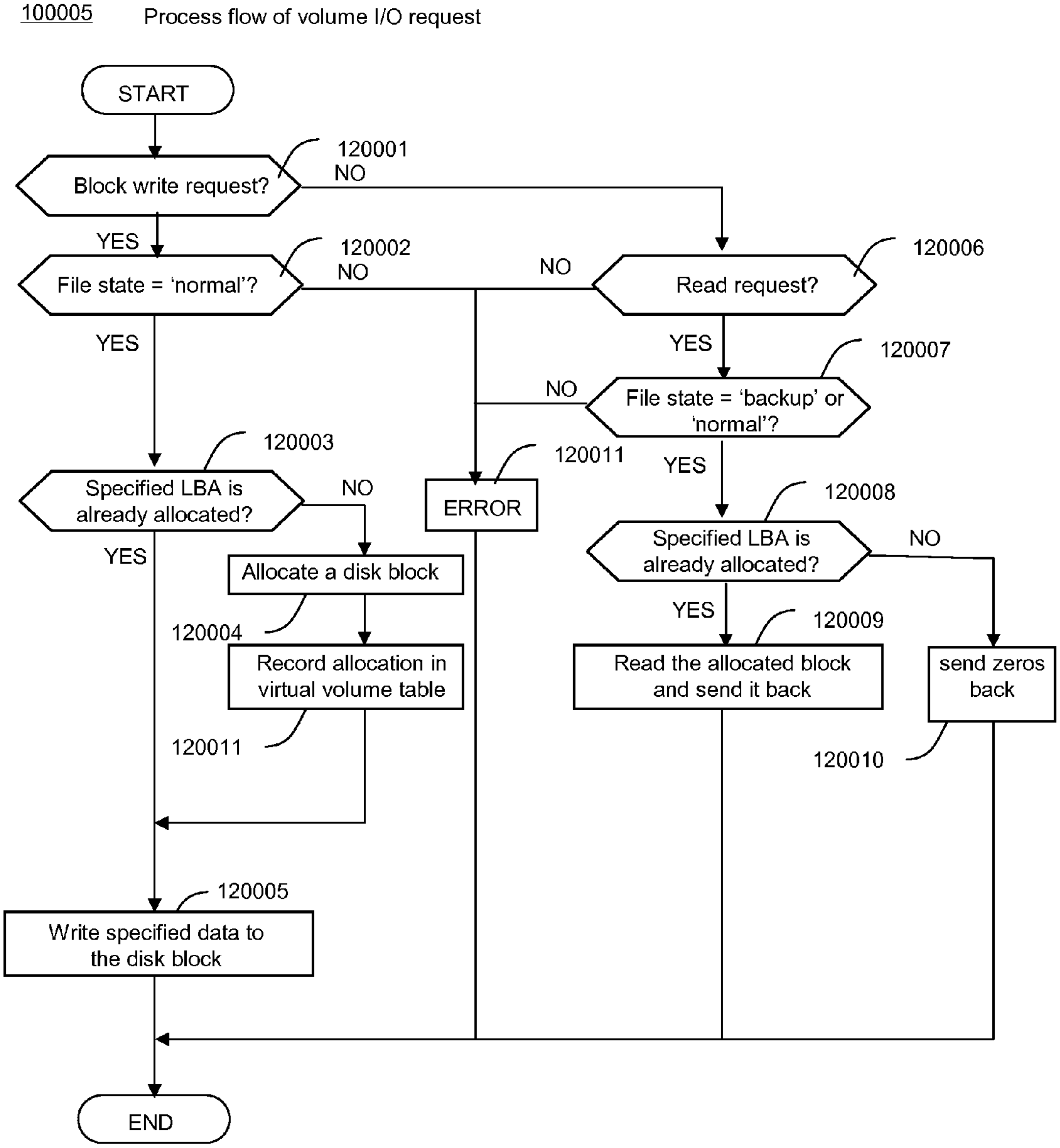
FIG. 12 shows the process details of an exemplary volume I/O request.

FIG. 12 shows the process details of the volume I/O request. The steps in this process flow to implement thin provisioning are well-known except for the step of checking the state of the virtual file. For the sake of simplicity in this embodiment, the volume I/O request reads or writes data in a sector of the virtual volume. If the storage system control program receives a write request to a virtual volume (120001) and the state of a virtual file which represents the volume is 'normal' (120002), then the request is accepted. If no disk block is allocated to a specified LBA (120003), i.e., allocation information 60005 for the LBA is invalid, the storage system control program allocates a disk block to the LBA and other LBAs which have same disk block number (120004) and records the information in virtual volume table (120011). Finally, it writes data received in the part of disk block addressed by specified LBA (120005). Otherwise, if the request is a read request (120006) and the file state is 'backup' or 'normal' (120007), the request is accepted. If no disk block is allocated to the LBA (120008), the storage system control program returns '0's to application server (120010). Otherwise, it reads the data from the part of allocated disk block addressed by specified LBA and sends it back to application server (120009).

Figure 13:
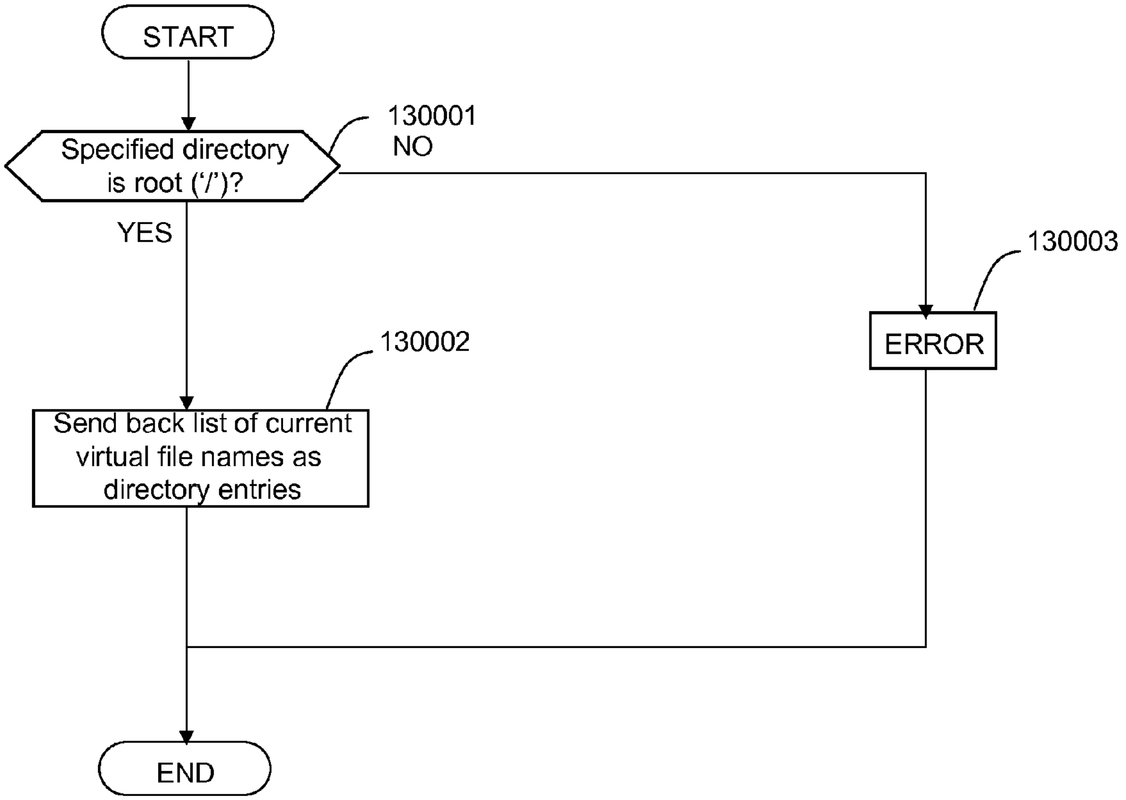
FIG. 13 shows the process details of an exemplary NFS READDIR operation.

FIG. 13 shows the process details of the NFS READDIR operation. If the operation specifies a root directory (130001), the storage system control program returns the list of current virtual file names in the virtual file table as directory entries of the root directory (130002).

Figure 14:
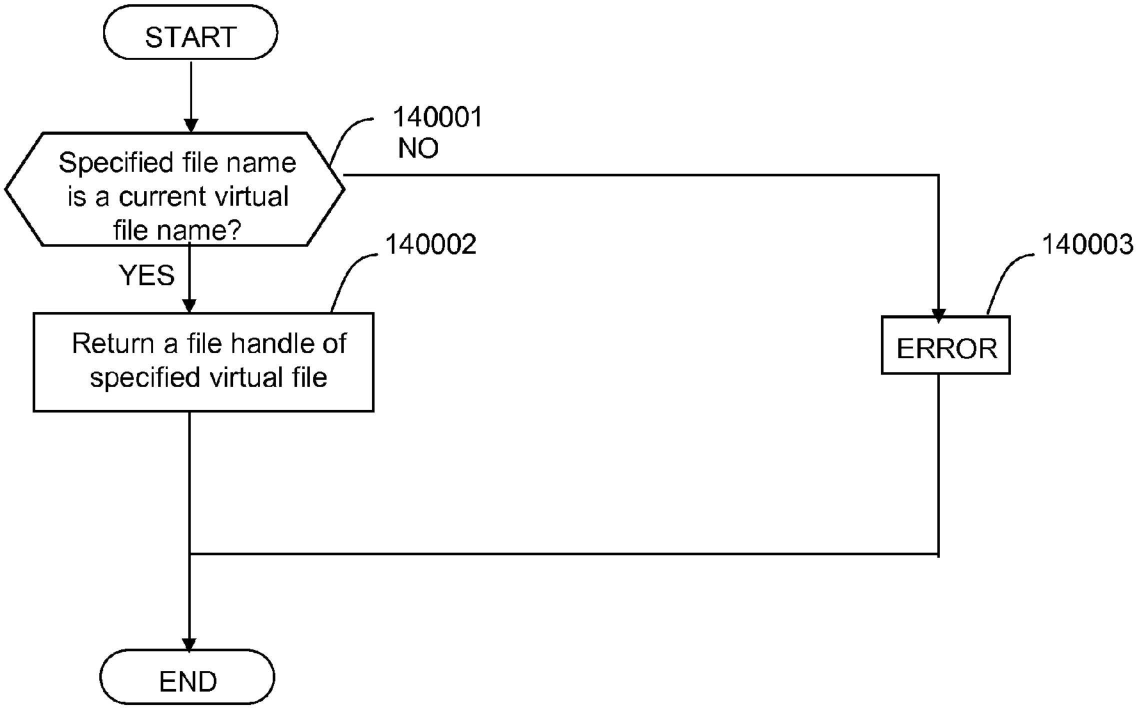
FIG. 14 shows the process details of an exemplary NFS LOOKUP operation.

FIG. 14 shows the process details of the NFS LOOKUP operation. If the operation specifies a current virtual file name recorded in virtual file table (140001), storage system control program returns a file handle of the file (140002).

Figure 15:
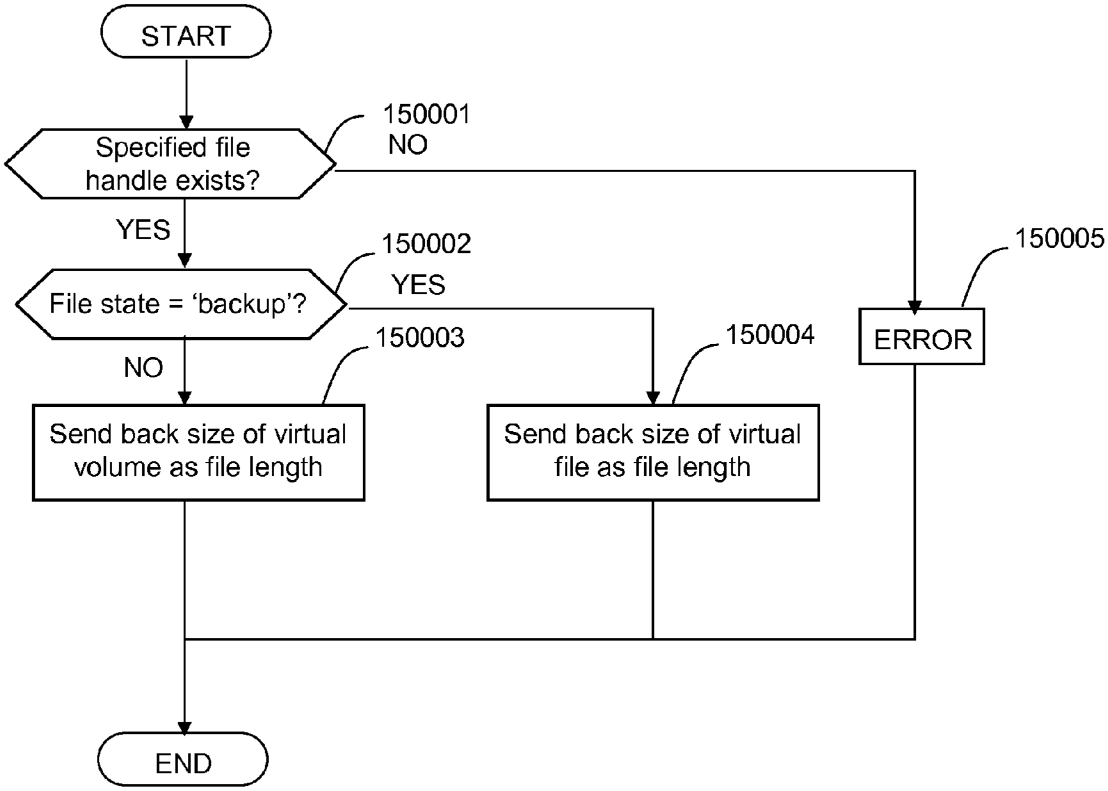
FIG. 15 shows the process details of an exemplary NFS GETATTR operation.

FIG. 15 shows the process details of the NFS GETATTR operation. If the operation specifies an existing file handle recorded in the virtual file table (150001), the storage system control program checks and returns the state of the file (150002). If the state is 'backup' (150002), i.e., the file image has been prepared to be backed up, the storage system control program returns the size of the virtual file 70006 recorded in virtual file table (150004). Otherwise, it returns the size of a virtual volume which is represented by the virtual file (150003) by referring to the virtual volume table.

Figure 16:
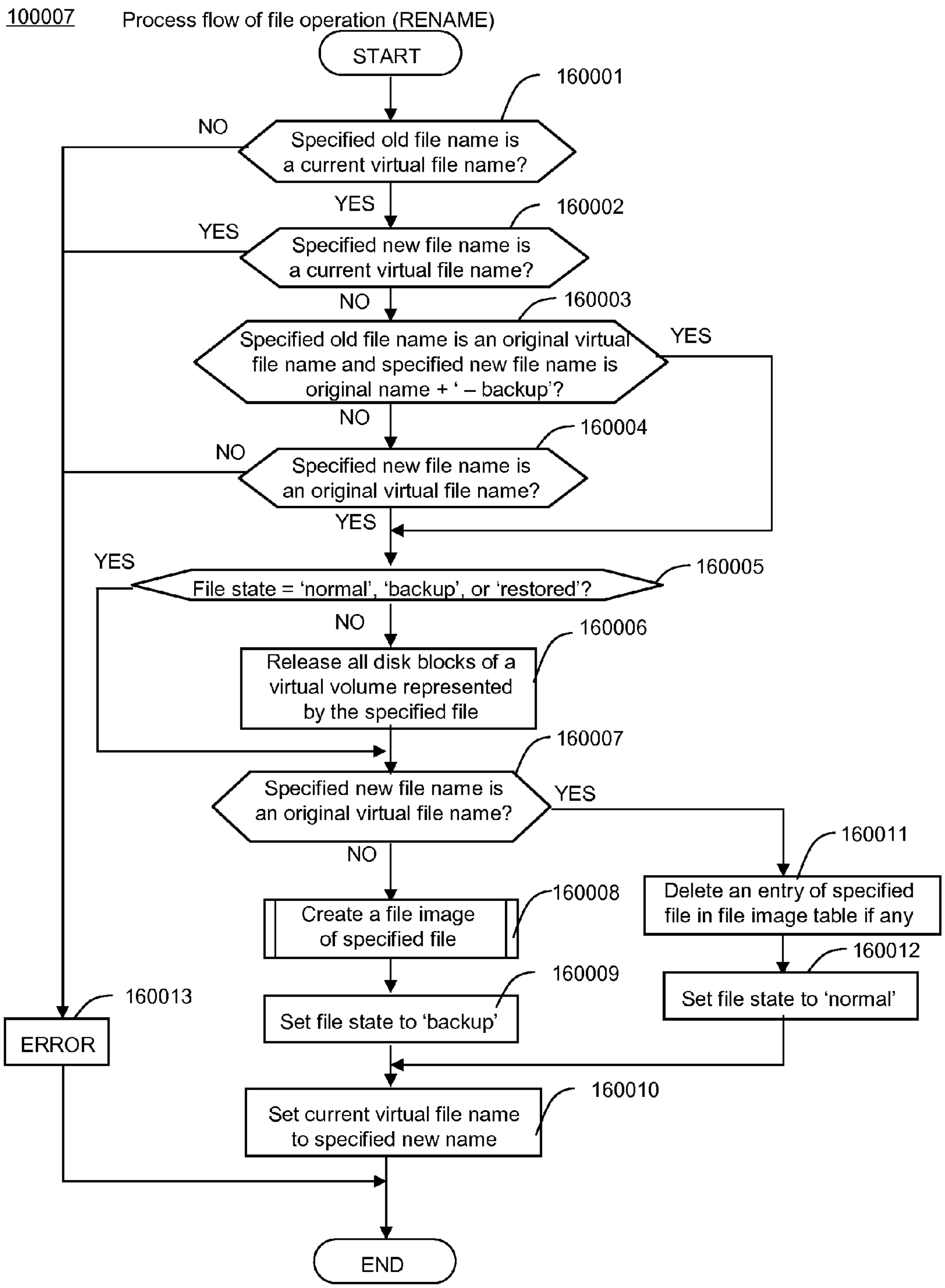
FIG. 16 shows the process details of an exemplary NFS RENAME operation.

FIG. 16 shows the process details of the NFS RENAME operation. The RENAME operation is used to control the beginning and the end of the backup process. It is also used to control the end of the restore process. If the operation indicates renaming an original name to its backup name or a backup name to its original name (160001-160004), the request is accepted. If the state of specified old file is not 'normal', 'backup' or 'restored' (160005), the specified file is being restored. In this case, the storage system control program aborts the restore process and releases all disk blocks allocated to the volume (160006). If the file is renamed to an original name (160007), i.e., the current state is 'backup' or 'restored' and its file image is created, the storage system control program deletes an entry of the specified file in file image table (160011) and sets file state to 'normal' in virtual file table (160012). Otherwise, it creates a virtual file image of the specified file (160008) and sets the file state to 'backup' (160009). Finally, the storage system control program sets the current virtual file name to specified new name (160010).

Figure 17:
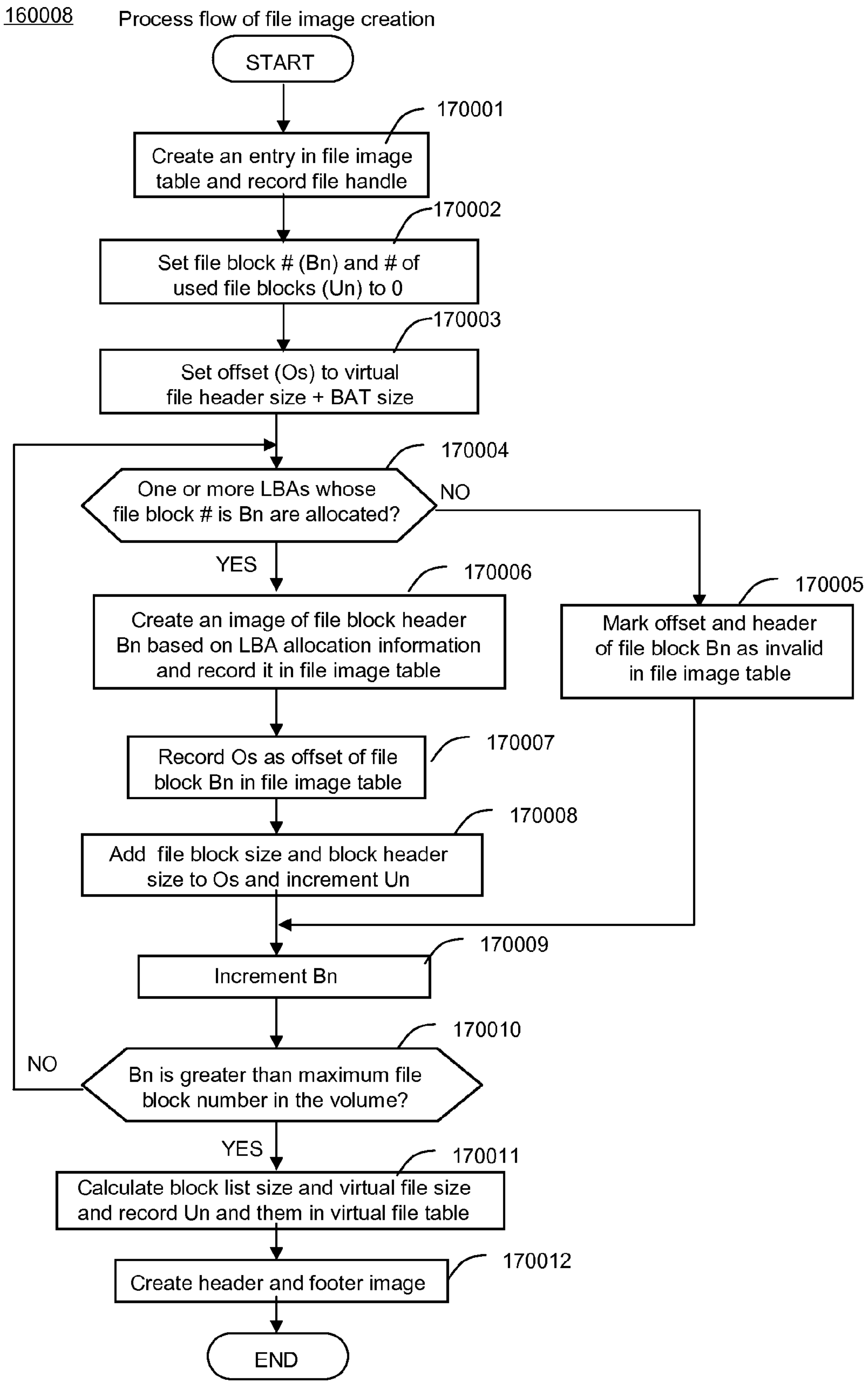
FIG. 17 shows the process details of an exemplary file image creation.

FIG. 17 shows the process details of the file image creation (160008). First, the storage system control program creates an entry in file image table for the specified file (170001). Steps 170002-170010 calculate and record an offset for each file block of the virtual file. Initially, the storage system control program sets the number of a file block to be processed (Bn) and the number of used file blocks (Un) to 0 (170002). It also sets the initial value of offset (Os) to be (size of virtual file header recorded in format table+BAT size recorded in virtual file table) (170003). For each file block number (Bn), if no disk block is allocated to any of the LBAs included in the file block (170004), the storage system control program marks the offset and header of file block Bn as invalid in file image table (170005). Otherwise, it creates and records an image of file block header in file image table based on the allocation information in the virtual volume table (170006). Next, it records Os as an offset of the file block in the file image table (170007), calculates the next offset (new value of Os) by adding the file block size and the block header size to Os, and increment Un (170008). These steps are repeated for each of the file block numbers assigned to the virtual volume (170009, 170010). Finally, the storage system control program records the number of used file blocks (Un), the block list size (Un*(file block size+file header size)) and the virtual file size (virtual file header size+BAT size+block list size+virtual file footer size) in the virtual file table (170011) and creates a header and footer image of the virtual file in the file image table (170012).

Figure 18:
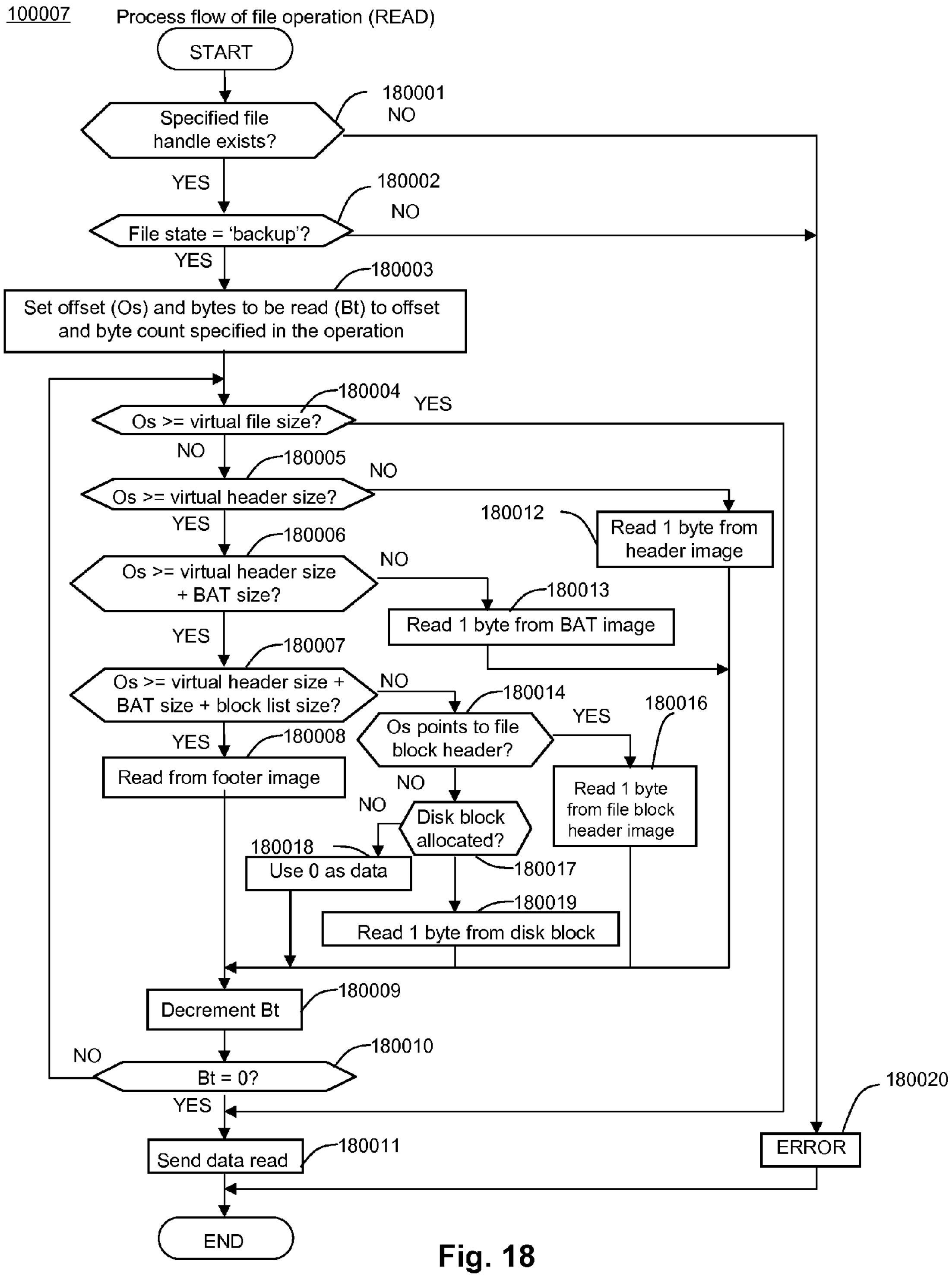
FIG. 18 shows the process details of an exemplary NFS READ operation.

FIG. 18 shows the process details of the NFS READ operation. If a specified file handle exists in the virtual file table and the state of the file is 'backup' (180001, 180002), the storage system control program reads specified bytes from the disk blocks or the file image table (180003-180010, 180012-180019) for each byte addressed by the offset (Os) and the number of bytes (Bt) specified in the operation. If the Os points out of range of the virtual file (180004), the storage system control program reads nothing. If the Os points to a byte of the virtual file header (180005), the BAT (180006) or the virtual file footer (180007), the storage system control program reads the specified byte from the file header image (180012), the BAT image (180013) or the file footer image (180008) in the file image table, respectively. The byte to be read in the image can be addressed by subtracting the size of preceding structures in the virtual file format from the Os. For example, the byte in the footer image can be addressed by the offset which is (Os−size of file header−size of BAT−size of block list). If the Os points to a byte of the file block header in the block list (180014), i.e., (Os−size of file header−size of BAT)%(size of block header+size of file block)<size of block header, the storage system control program reads the specified byte from the addressed file block header image from the file image table (180016). Otherwise, it checks whether the sector which includes the specified byte has a disk block or not (180017). To calculate the LBA of the sector, the storage system control program identifies a file block which includes the byte, i.e., its offset (Os') recorded in BAT is smaller than Os and Os is smaller than (Os'+the size of file block header+the size of file block). The LBAs included in the file block can be identified by the number of the file block in virtual volume table. Among these LBAs, the Nth LBA includes the specified byte where N=M/(size of virtual volume sector), M=((Os−size of file header−size of BAT)%(size of block header+size of file block)−size of block header). Byte offset in the LBA can be calculated as M % (size of virtual volume sector).

If a disk block is allocated, i.e., the allocation information of the LBA identified above is not invalid in virtual volume table, the storage system control program reads a specified byte from the disk block which is allocated to the LBA (180019). Otherwise, it uses '0' as the data contained in the byte (180018). These steps are repeated for each byte specified in the operation (180009, 180010). Finally, the storage system control program sends the data read back (180011).

Figure 19:
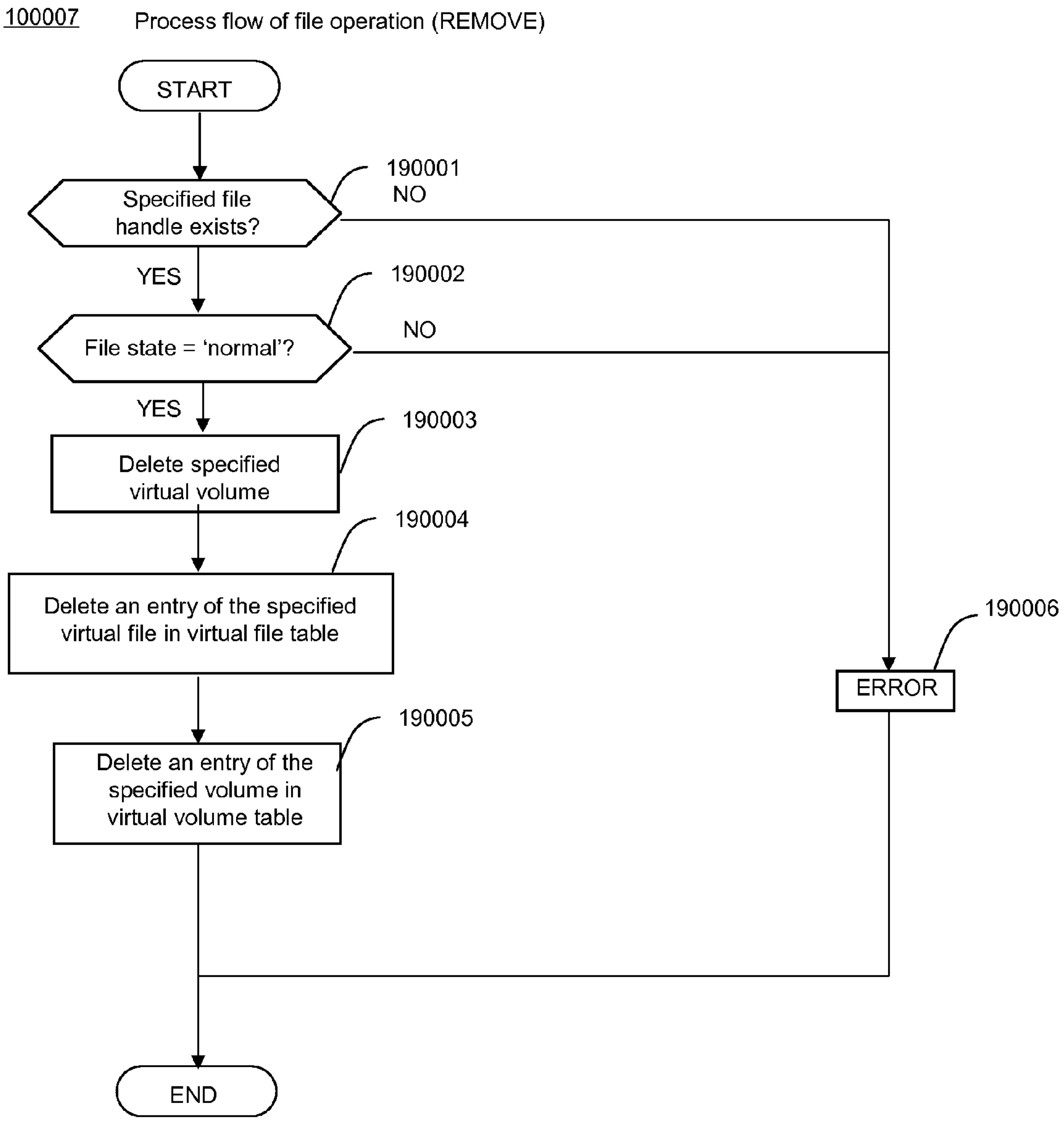
FIG. 19 shows the process details of an exemplary NFS REMOVE operation.

FIG. 19 shows the process details of the NFS REMOVE operation. If the specified file handle exists in the virtual file table and the state of the file is 'normal' (190001, 190002), the storage system control program releases all disk blocks in a virtual volume represented by the specified virtual file and deletes the volume (190003). The storage system control program also deletes the entries of the volume in the virtual volume table, the virtual file table and the file image table (190004, 190005).

Figure 20:
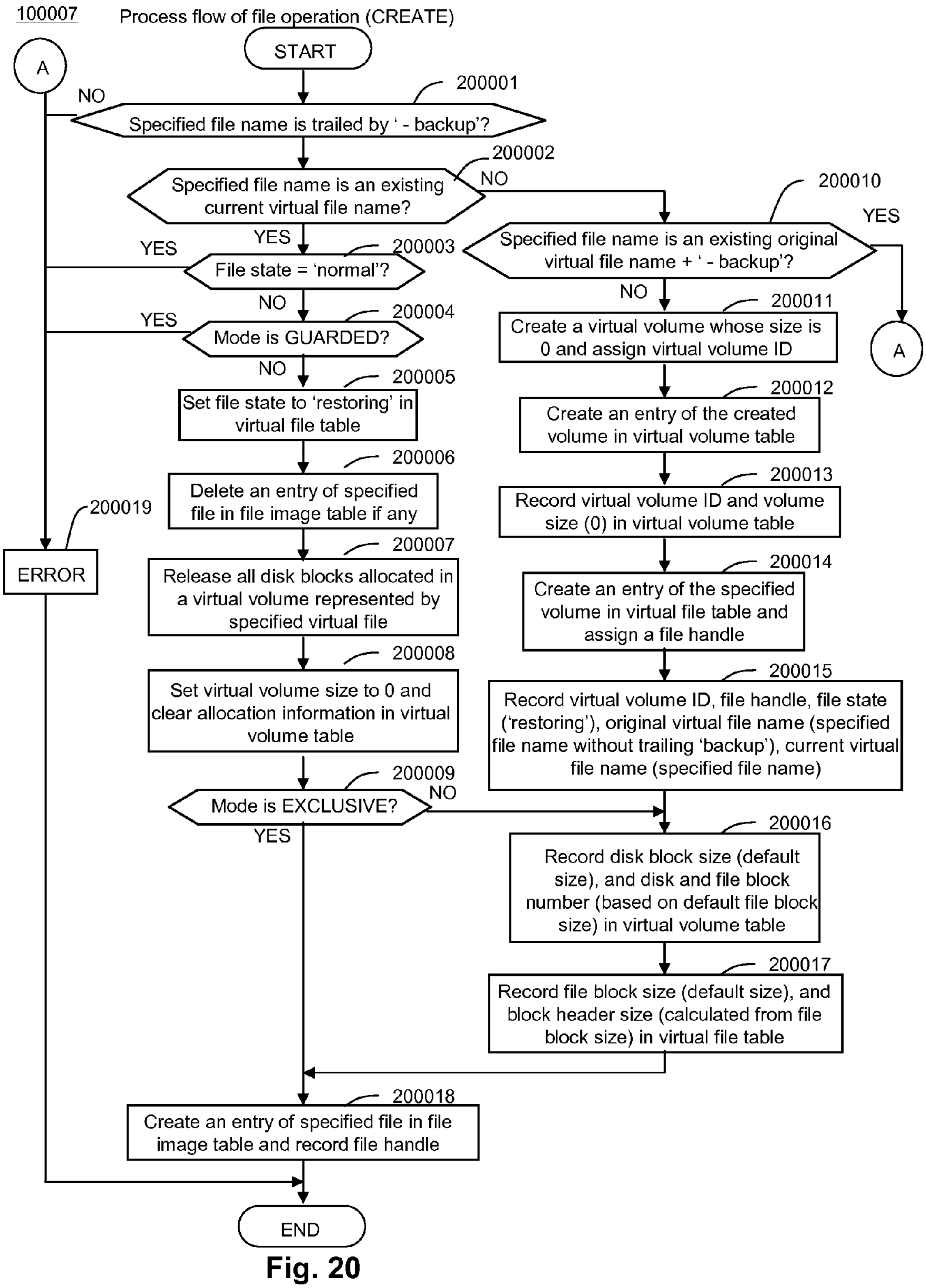
FIG. 20 shows the process details of an exemplary NFS CREATE operation.

FIG. 20 shows the process details of the NFS CREATE operation. The CREATE operation is used to control the beginning of the restore process. In this embodiment, the name of a virtual file to be created must be trailed by '-backup' (200001) and must not be identical to the names of any other virtual files when they are renamed (200010). If the specified file name exists in the virtual file table as a current file name (200002) and its state is not 'normal' (200003) and the mode of the CREATE operation is not GUARDED which indicates that any of the existing files must not have the same name as the file to be created (200004), the storage system control program sets the file state to 'restoring' (200005). When an existing virtual volume is restored, all disk blocks allocated to the volume are released and data stored in the disk blocks are lost (200007). The storage system control program sets the size of the virtual volume to 0 and clears the allocation information in the virtual volume table (200008). If EXCLUSIVE mode is specified (200009), the current values of disk block size recorded in the virtual volume table and the file block size recorded in the virtual file table are not modified. Otherwise, i.e., UNCHECKED mode is specified, default values are set (200016, 200017). The disk and file block number in the virtual file table and BAT size and block header size in the virtual file table are also reset based on the default values.

If the file to be created is a new file which does not represent any existing virtual volume, the storage system control program creates a new virtual volume whose size is 0 and assigns a virtual volume ID to it (200011). It also creates entries in the virtual volume table and the virtual file table and also records the information about the created volume based on the information specified in the NFS operation and default values (200012-200017). Finally, the storage system control program creates an entry of the volume in the file image table (200018).

Figure 21:
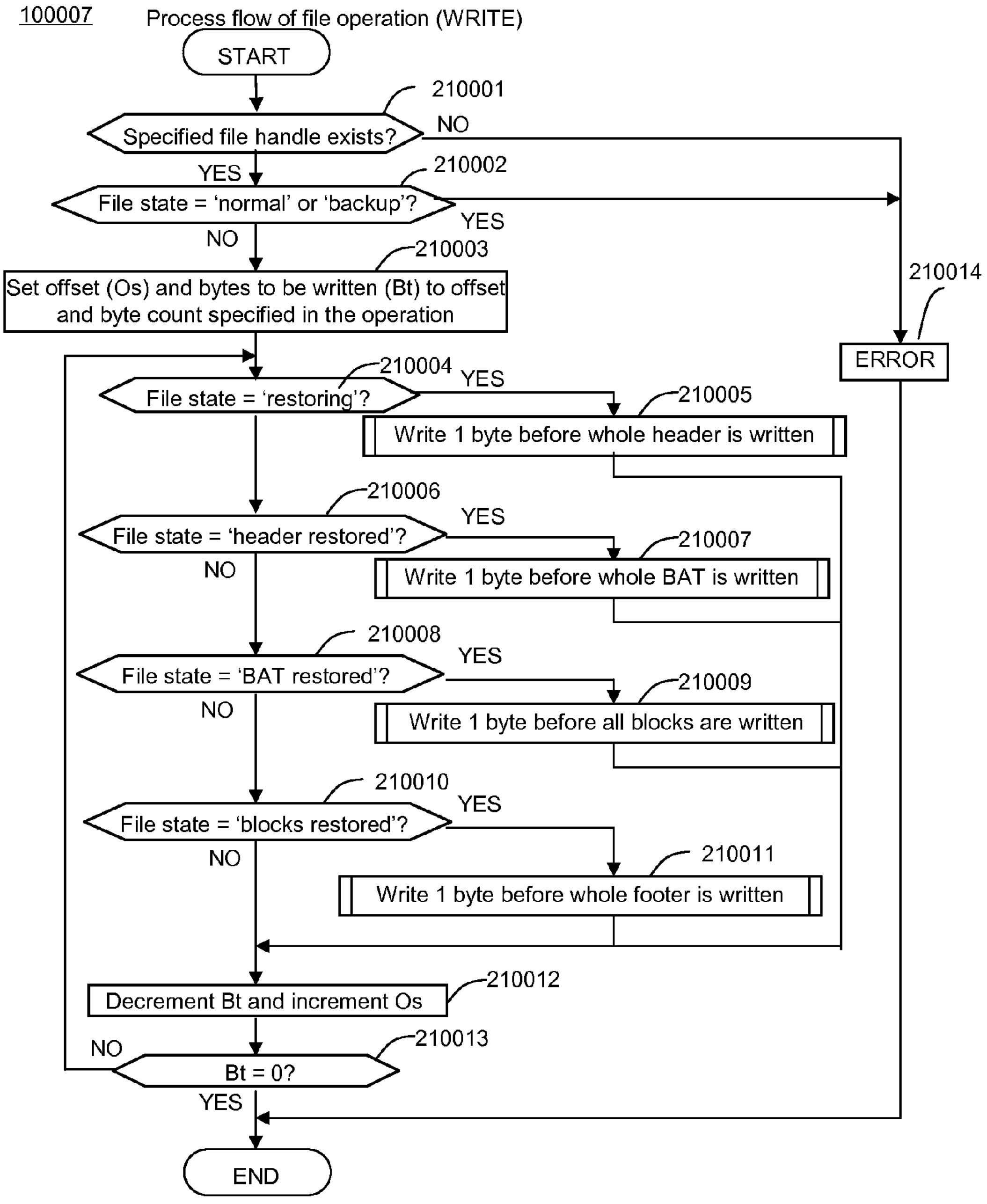
FIG. 21 shows the process details of an exemplary NFS WRITE operation.

FIG. 21 shows the process details of the NFS WRITE operation. In this embodiment, for the sake of simplicity, data is written to a file from the beginning of the file to the end of the file sequentially in the restore process. That is, a file is written in the order of header, BAT, block list, and footer as shown in FIG. 4*a*. In a block list entry, the block header is written first preceding the file block. If data is written not sequentially, it is possible to handle them by using a well-known technique like data buffering. Also, in this embodiment, it is assumed that a file to be written is in the valid virtual file format. If the format is invalid, it is possible to detect the invalidity by using a well-known technique like checksum or digital signing. If the specified file handle exists in the virtual file table (210001) and the state of the file is neither 'normal' nor 'backup' (210002), the operation is accepted. Like the NFS READ operation, the storage system control program processes for each byte addressed by the offset (Os) and the number of bytes (Bt) specified in the operation (210003). Also, the location to be written in file image table or disk blocks can be identified by the similar calculation described in the explanation of READ operation.

Based on the file state (210004, 210006, 210008, 210010), each byte is processed differently (210005, 210007, 210009, 210011).

Figure 22:
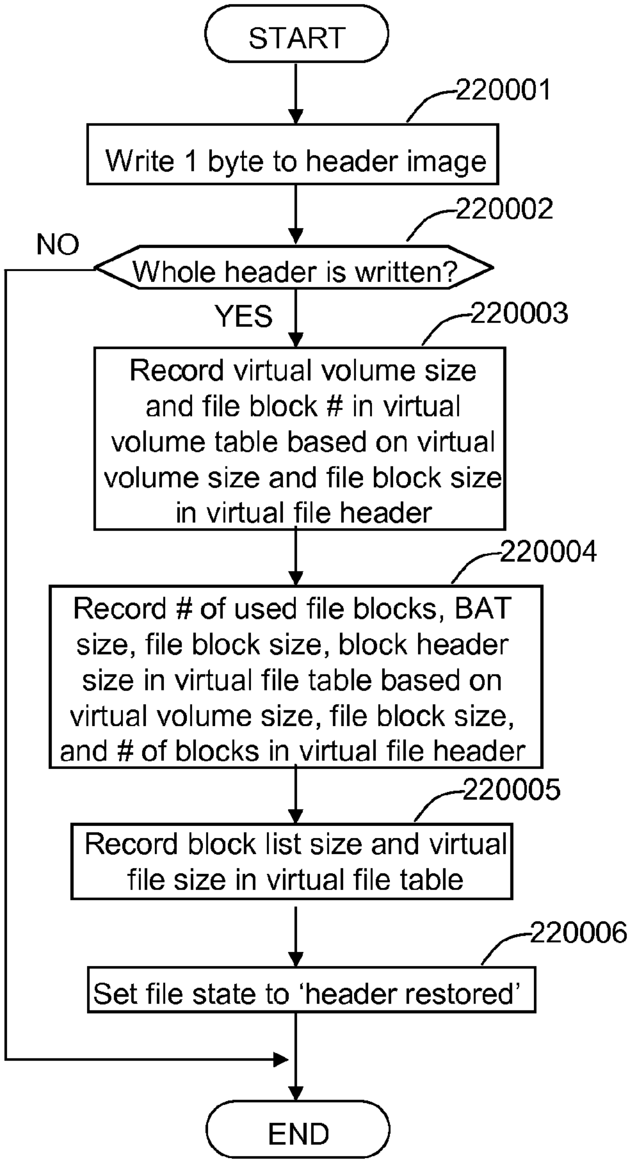
FIG. 22 shows exemplary details of the write 1 byte process in 'restoring' state.

FIG. 22 shows details of the write 1 byte process in 'restoring' state. The specified byte is written to the header image in file image table (220001). If the whole header is written (220002), the storage system control program extracts the virtual volume size, the file block size and the number of used file blocks from the header and records them in the virtual volume table and the virtual file table. Also, it calculates and records the file block number in the virtual volume table as well as the BAT size, file block size, block header size, block list size, and virtual file size in the virtual file table based on the extracted values (220003-220005). Finally, it sets the file state to 'header restored' (220006).

Figure 23:
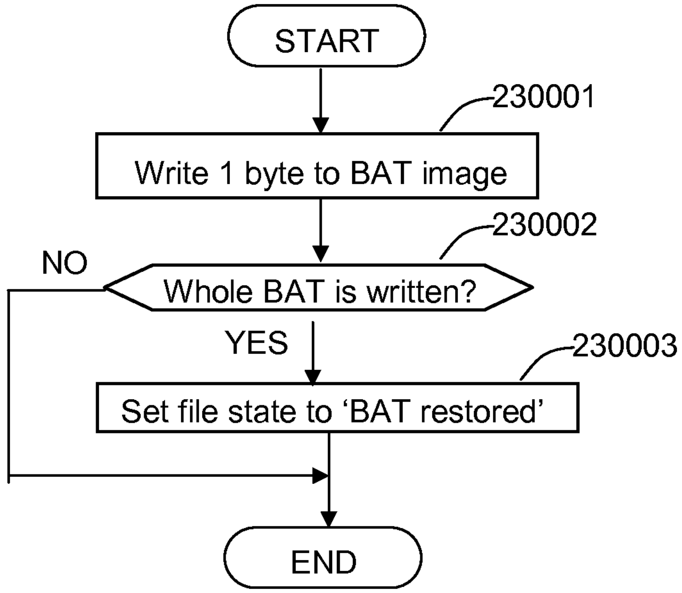
FIG. 23 shows exemplary details of the write 1 byte process in 'header restored' state.

FIG. 23 shows details of the write 1 byte process in 'header restored' state. The specified byte is written to the BAT image in the file image table (230001). If the whole BAT is written (230002), the storage system control program sets the file state to 'BAT restored' (230003).

Figure 24:
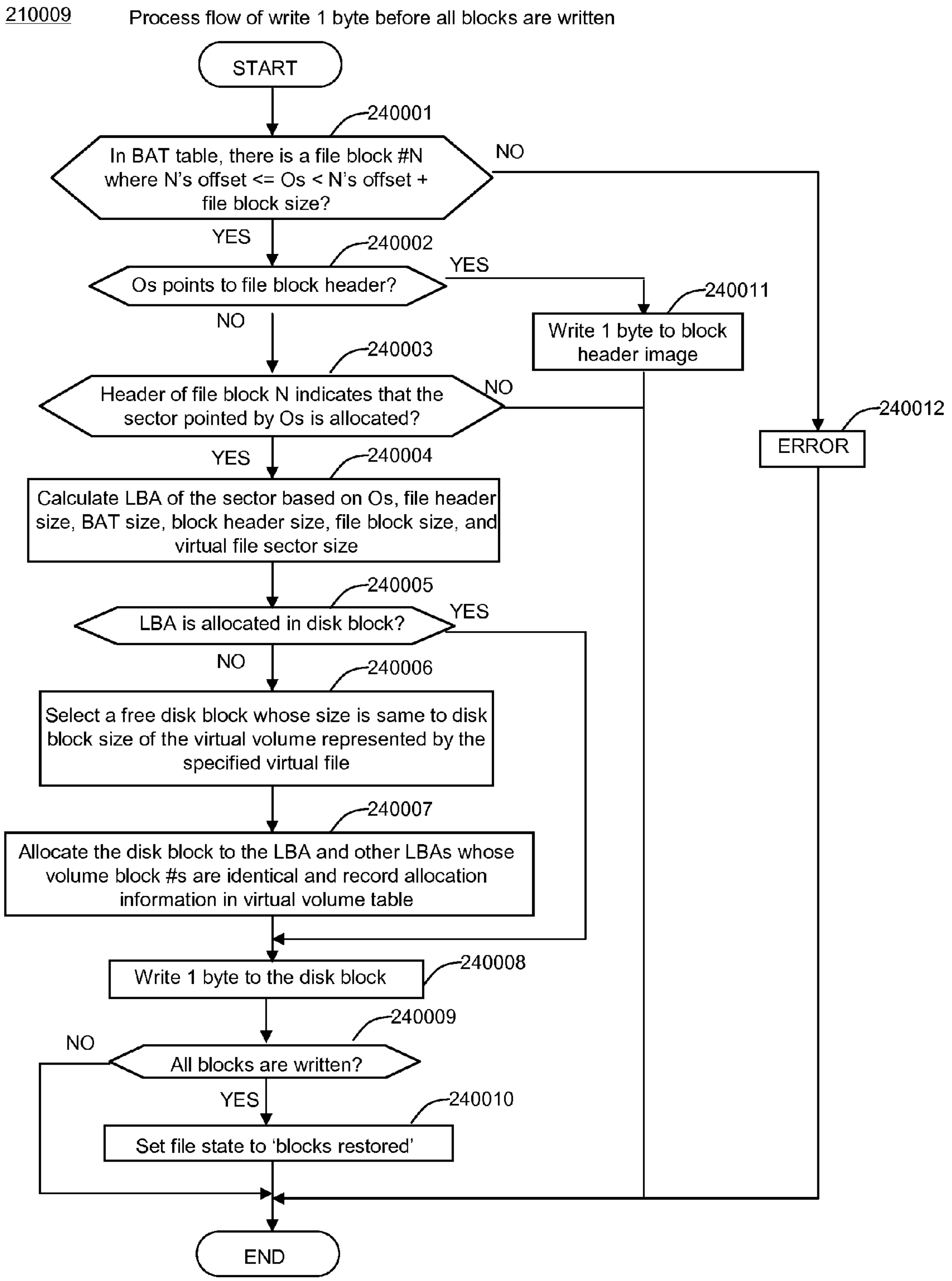
FIG. 24 shows exemplary details of the write 1 byte process in 'BAT restored' state.

FIG. 24 shows details of the write 1 byte process in 'BAT restored' state. Through the calculations described in the explanation of READ operation, Os can be converted to a file block number, LBA, and byte offset in a file block header, file block, or virtual volume sector. The storage system control program identifies the file block number of the specified byte. If it finds that the block number N (240001) and Os points to a byte in a file block header (240002), the storage system control program writes the byte to block header image in the file image table (240011). Otherwise, it identifies a sector which includes the byte in the file block and checks whether the sector is valid or not by referring to the bitmap in the file block header (240003). If the sector is invalid, the byte is also invalid and does not have to be written. Otherwise, the storage system control program calculates the LBA which includes the specified byte (240004). If no disk block is allocated to the LBA (240005), it selects a free disk block whose size is equal to the disk block size of the virtual volume and allocates the disk block to the LBA and other LBAs whose disk block numbers are identical and records allocation information in the virtual volume table (240006, 240007). It writes the byte to the allocated disk block (230008) and sets the file state to 'blocks restored' (240010) if all of the file blocks are written (240009).

Figure 25:
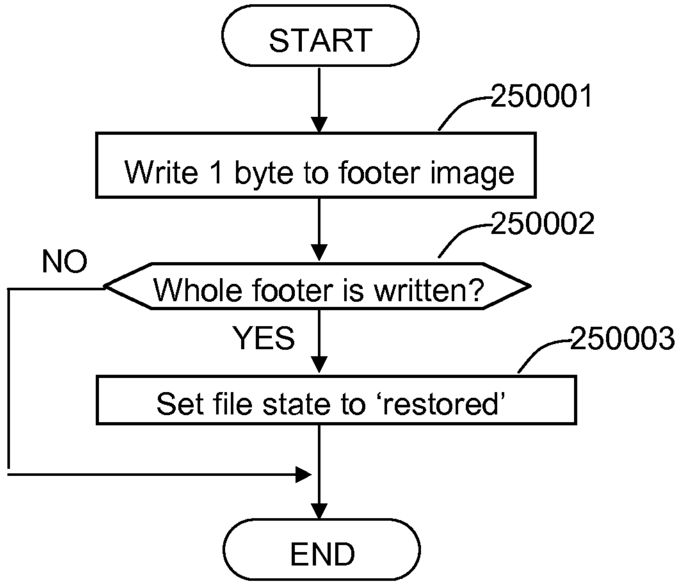
FIG. 25 shows exemplary details of the write 1 byte process in 'blocks restored' state.

FIG. 25 shows details of the write 1 byte process in 'blocks restored' state. The specified byte is written to the footer image in the file image table (250001). If the entire footer is written (250002), the storage system control program sets the file state to 'restored' (250003). In this embodiment, the footer has no information. However, if it contains any useful information, it can be extracted after the entire footer is written. After the file state is set to 'restored', the backup server can rename the virtual file to the original name without '-backup' and make the virtual volume accessible from the application server as described in the explanation of RENAME operation.

As shown above, the virtual volume is exposed as a virtual file in a virtual file system. The volume-based backup of the virtual volume can be performed by reading the virtual file without reading volume segments to which any disk blocks are not allocated. Backup and restore processes are controlled by sending NFS operations from the backup server to a virtual file system which contains the virtual file. If the format of the virtual file is a virtual disk file format, this invention can be used to convert a virtual volume to a virtual disk file and vice versa. Also, this conversion can be applied to a conventional physical volume which is considered as a virtual volume whose LBAs all have disk blocks. In this embodiment, a virtual volume and a virtual file are provided by a single storage system. However, it can also be implemented as two separate storage systems which are connected by a network and exchange the information recorded in management tables. In such a case, one storage system provides virtual volumes and the other provides the virtual file system. In addition, several protocols like HTTP, WebDAV, and CIFS can be used to access the virtual file. Furthermore, it is possible to process READ and WRITE requests in the unit of a virtual volume sector instead of one byte if the offset and number of bytes specified in the operation is aligned to sectors.

Second Embodiment

In this embodiment, when a virtual volume is being backed up, an application server can read and write data in the virtual volume. A snapshot of the virtual volume is maintained by the storage system and a virtual file is created based on the snapshot. The difference from the first embodiment is described below.

FIG. 26 shows an example structure of the virtual volume table in this embodiment. For each LBA in a virtual volume, in addition to the allocation information of the LBA 60005, there is allocation information of its snapshot (260002) and write flag (260001) which indicates whether the LBA is written after the snapshot is created if its value is 'TRUE'.

Figure 27:
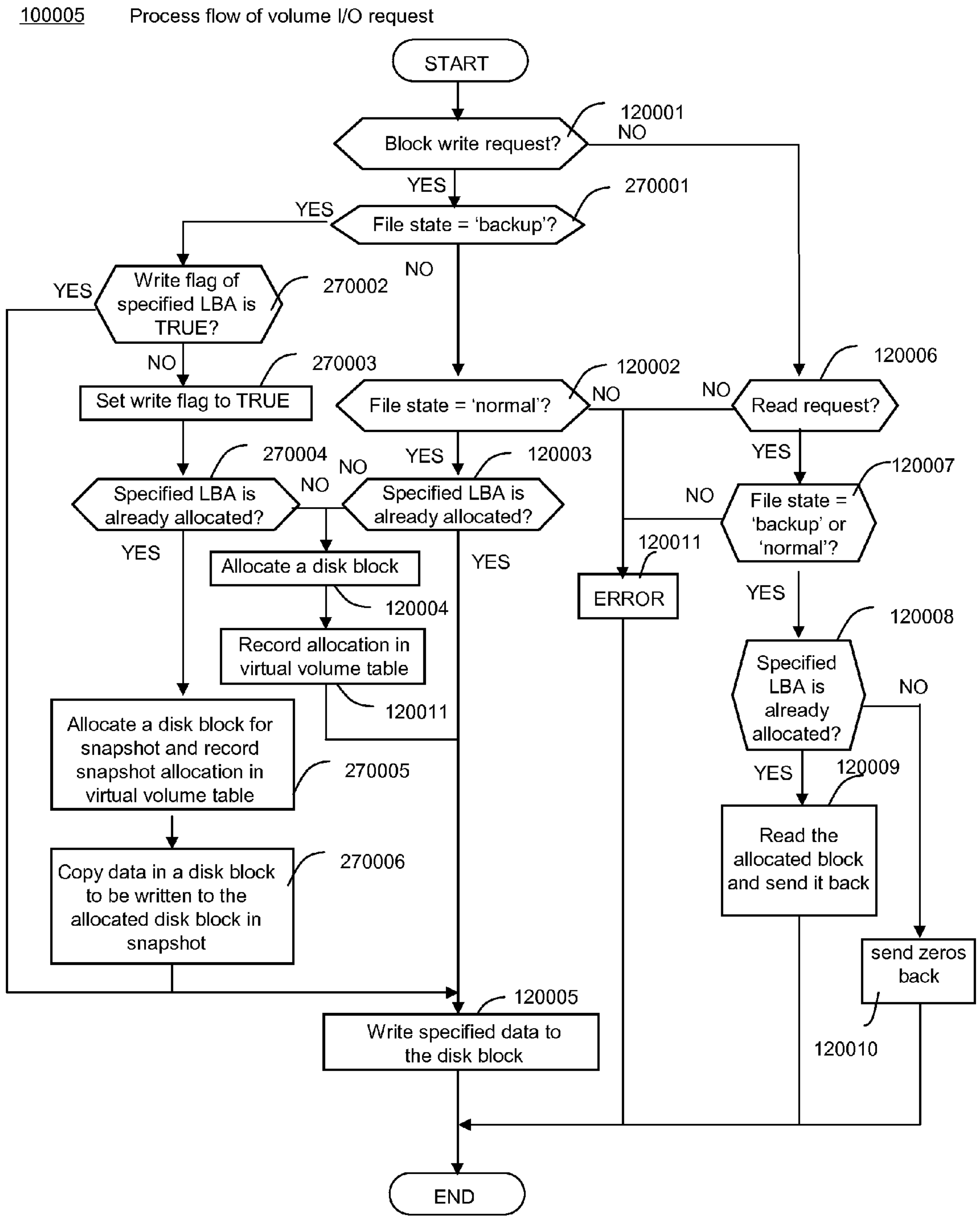
FIG. 27 shows the process details of an exemplary volume I/O request in the second embodiment.

FIG. 27 shows the detail of process of the volume I/O request in the second embodiment. In this embodiment, steps 270001-270006 are added to FIG. 12. If the storage system control program receives a write request to a virtual volume and the state of its virtual file is 'backup' (270001), the storage system control program writes the data to the allocated disk block of the virtual volume if the write flag of the specified LBA is TRUE (270002) because the flag indicates the LBA is written before this write request and snapshot has already been created by the previous write request. Otherwise, the storage system control program sets write flag of the LBA to TRUE (270003). If the LBA has a disk block allocated (270004), the storage system control program allocates a free disk block to take a snapshot of the LBA and other LBAs whose disk block numbers are identical and record the allocation information 260002 in the virtual volume table (270005). It will also copy the original data in the LBAs to the allocated disk block of snapshot (270006) before it writes the data to the disk block of the virtual volume so that snapshot keeps the original volume image.

Figure 28:
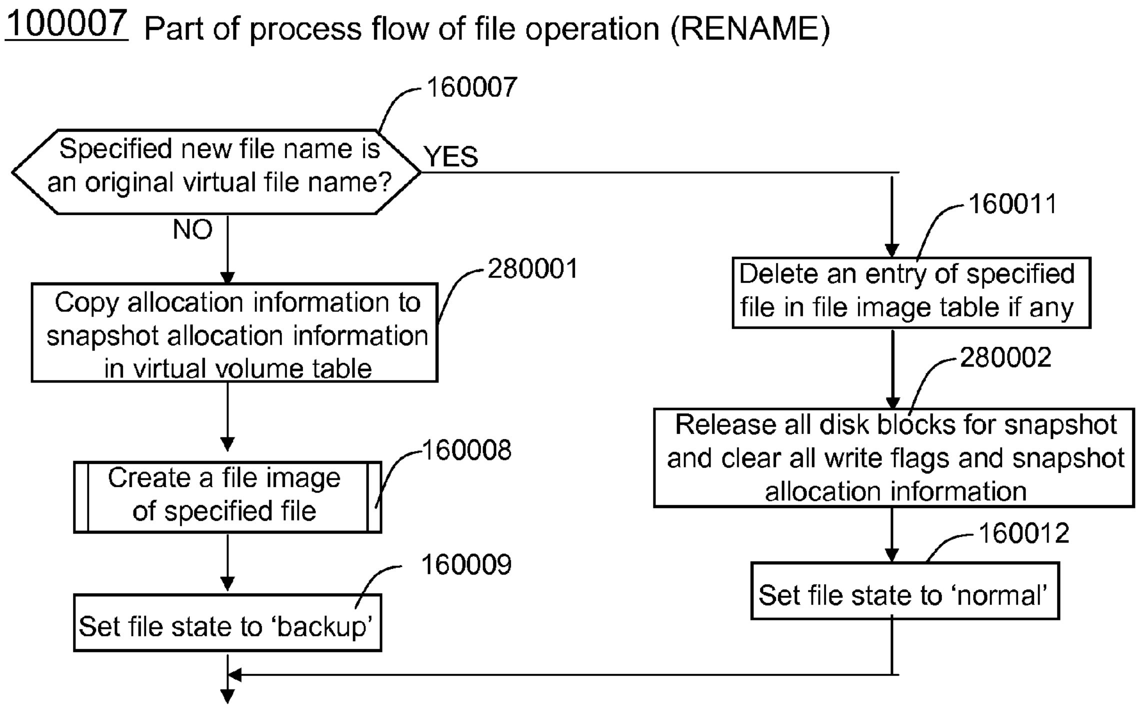
FIG. 28 shows parts of the process for an exemplary NFS RENAME operation.

FIG. 28 shows parts of the process for the NFS RENAME operation. In this embodiment, step 280001 is inserted between step 160007 and 160008 in FIG. 16. Also step 280002 is inserted between 160011 and 160012. In step 280001, the storage system control program copies all allocation information 60005 to snapshot allocation information 260002 in the virtual volume table. That creates an initial snapshot image which contains the same image of the original virtual volume. In step 280002, when the image of the virtual file is deleted, the snapshot is also deleted by releasing all disk blocks allocated to the snapshot and by clearing all write flags and snapshot allocation information.

In the process flow of other requests, all file operations refer to snapshot allocation information 260002 in the virtual volume table instead of allocation information 60005 in the first embodiment. The storage system control program releases all disk blocks allocated to a snapshot of a virtual volume when it releases all disk blocks allocated to the virtual volume. Also, it clears all snapshot allocation information 260002 and write flags 260001 when it clears all allocation information 60005.

In this embodiment, a snapshot of a virtual volume is maintained so that the application server can read/write data from/to the virtual volume when it is being backed up.

Exemplary Computer Platform

Figure 29:
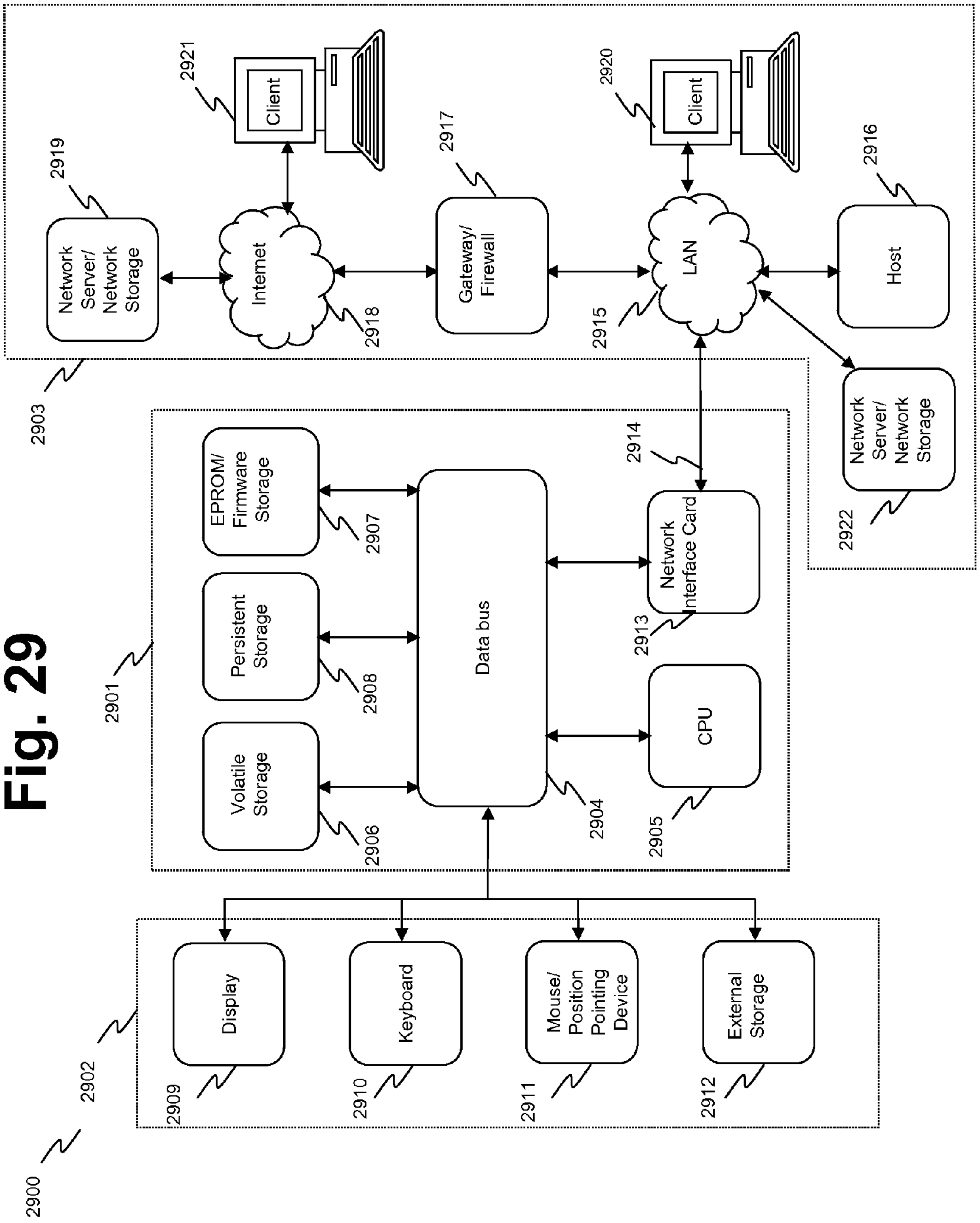
FIG. 29 illustrates an exemplary embodiment of a computer platform upon which the inventive system may be implemented.

FIG. 29 is a block diagram that illustrates an embodiment of a computer/server system 2900 upon which an embodiment of the inventive methodology may be implemented. The system 2900 includes a computer/server platform 2901, peripheral devices 2902 and network resources 2903.

The computer platform 2901 may include a data bus 2904 or other communication mechanism for communicating information across and among various parts of the computer platform 2901, and a processor 2905 coupled with bus 2901 for processing information and performing other computational and control tasks. Computer platform 2901 also includes a volatile storage 2906, such as a random access memory (RAM) or other dynamic storage device, coupled to bus 2904 for storing various information as well as instructions to be executed by processor 2905. The volatile storage 2906 also may be used for storing temporary variables or other intermediate information during execution of instructions by processor 2905. Computer platform 2901 may further include a read only memory (ROM or EPROM) 2907 or other static storage device coupled to bus 2904 for storing static information and instructions for processor 2905, such as basic input-output system (BIOS), as well as various system configuration parameters. A persistent storage device 2908, such as a magnetic disk, optical disk, or solid-state flash memory device is provided and coupled to bus 2901 for storing information and instructions.

Computer platform 2901 may be coupled via bus 2904 to a display 2909, such as a cathode ray tube (CRT), plasma display, or a liquid crystal display (LCD), for displaying information to a system administrator or user of the computer platform 2901. An input device 2910, including alphanumeric and other keys, is coupled to bus 2901 for communicating information and command selections to processor 2905. Another type of user input device is cursor control device 2911, such as a mouse, a trackball, or cursor direction keys for communicating direction information and command selections to processor 2904 and for controlling cursor movement on display 2909. This input device typically has two degrees of freedom in two axes, a first axis (e.g., x) and a second axis (e.g., y), that allows the device to specify positions in a plane.

An external storage device 2912 may be coupled to the computer platform 2901 via bus 2904 to provide an extra or removable storage capacity for the computer platform 2901. In an embodiment of the computer system 2900, the external removable storage device 2912 may be used to facilitate exchange of data with other computer systems.

The invention is related to the use of computer system 2900 for implementing the techniques described herein. In an embodiment, the inventive system may reside on a machine such as computer platform 2901. According to one embodiment of the invention, the techniques described herein are performed by computer system 2900 in response to processor 2905 executing one or more sequences of one or more instructions contained in the volatile memory 2906. Such instructions may be read into volatile memory 2906 from another computer-readable medium, such as persistent storage device 2908. Execution of the sequences of instructions contained in the volatile memory 2906 causes processor 2905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2905 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 2908. Volatile media includes dynamic memory, such as volatile storage 2906.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 2905 for execution. For example, the instructions may initially be carried on a magnetic disk from a remote computer. Alternatively, a remote computer can load the instructions into its dynamic memory and send the instructions over a telephone line using a modem. A modem local to computer system 2900 can receive the data on the telephone line and use an infra-red transmitter to convert the data to an infra-red signal. An infra-red detector can receive the data carried in the infra-red signal and appropriate circuitry can place the data on the data bus 2904. The bus 2904 carries the data to the volatile storage 2906, from which processor 2905 retrieves and executes the instructions. The instructions received by the volatile memory 2906 may optionally be stored on persistent storage device 2908 either before or after execution by processor 2905. The instructions may also be downloaded into the computer platform 2901 via Internet using a variety of network data communication protocols well known in the art.

The computer platform 2901 also includes a communication interface, such as network interface card 2913 coupled to the data bus 2904. Communication interface 2913 provides a two-way data communication coupling to a network link 2914 that is coupled to a local network 2915. For example, communication interface 2913 may be an integrated services digital network (ISDN) card or a modem to provide a data communication connection to a corresponding type of telephone line. As another example, communication interface 2913 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2913 sends and receives electrical, electromagnetic or optical signals that carry digital data streams representing various types of information.

Network link 2913 typically provides data communication through one or more networks to other network resources. For example, network link 2914 may provide a connection through local network 2915 to a host computer 2916, or a network storage/server 2917. Additionally or alternatively, the network link 2913 may connect through gateway/firewall 2917 to the wide-area or global network 2918, such as an Internet. Thus, the computer platform 2901 can access network resources located anywhere on the Internet 2918, such as a remote network storage/server 2919. On the other hand, the computer platform 2901 may also be accessed by clients located anywhere on the local area network 2915 and/or the Internet 2918. The network clients 2920 and 2921 may themselves be implemented based on the computer platform similar to the platform 2901.

Local network 2915 and the Internet 2918 both use electrical, electromagnetic or optical signals that carry digital data streams. The signals through the various networks and the signals on network link 2914 and through communication interface 2913, which carry the digital data to and from computer platform 2901, are exemplary forms of carrier waves transporting the information.

Computer platform 2901 can send messages and receive data, including program code, through the variety of network(s) including Internet 2918 and LAN 2915, network link 2914 and communication interface 2913. In the Internet example, when the system 2901 acts as a network server, it might transmit a requested code or data for an application program running on client(s) 2920 and/or 2921 through Internet 2918, gateway/firewall 2917, local area network 2915 and communication interface 2913. Similarly, it may receive code from other network resources.

The received code may be executed by processor 2905 as it is received, and/or stored in persistent or volatile storage devices 2908 and 2906, respectively, or other non-volatile storage for later execution. In this manner, computer system 2901 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the methods and apparatuses which perform backup and restore of thin provisioning volumes by exposing them as portable virtual disk files. It is intended that the specification and examples be considered as exemplary only, with a true scope and spirit of the invention being indicated by the following claims.

What is claimed is:

1. A system, comprising:

a storage system comprising a storage system control module, one or more virtual volumes and a virtual file system, wherein each virtual volume is represented as a virtual file within the virtual file system, each virtual file representing data actually stored within the virtual volume;

wherein the storage system control module is configured to facilitate performance of operations for backing up a selected virtual volume, the operations for backing up a selected virtual volume comprising:

accessing the virtual file system on the storage system; and reading the virtual file corresponding to the selected virtual volume;

wherein the storage system control module is further operable to facilitate perform operations for restoring a selected virtual volume, the operations for restoring a selected virtual volume comprising:

accessing the virtual file system on the storage system; and creating a virtual file representing the selected virtual volume;

wherein the storage system control module is configured to generate file image information for file image creation, the generating file image information comprising:

referring to virtual volume information comprising volume logical block address information and disk block allocation information;

generating, based on referring to the virtual volume information, an image of a file block header in the file image information determining an offset in the file image information for each file block based on the disk block allocation information; and generating header and footer image information for the file image information based on the determined offset in the file image information for the each file block; and wherein the storage system control module is further configured to read the file image information and perform one of a create operation and a write operation to facilitate the operations for backing up the selected virtual volume.

2. The system of claim 1, wherein each virtual volume is addressed by a Logical Block Address (LBA).

3. The system of claim 1, wherein the operations for restoring a selected virtual volume further comprises prohibiting read/write access to the selected virtual volume while the virtual file is being created.

4. The system of claim 1, wherein each virtual file in the virtual file system comprises a block list.

5. The system of claim 4, wherein each virtual volume is divided into file blocks, and wherein the block list of the representing virtual file comprises the file blocks that contain data.

6. The system of claim 5, wherein each virtual file in the virtual file system further comprises a Block Allocation Table (BAT), wherein the BAT contains an offset for each file block contained in the file block list.

7. The system of claim 6, wherein the system further comprises a backup server sending requests in NFS protocol to the storage system to execute the backup and restore operations.

8. The system of claim 7, further comprising a virtual file table, the virtual file table indicating a status of each virtual file in the virtual file system, the status selected from a group comprising of normal, backup, or restoring.

9. The system of claim 1, wherein the operations for backing up a selected virtual volume further comprises prohibiting write access to the selected virtual volume.

10. The system of claim 1, further comprising a management server, the management server providing a user interface receiving requests for backup or restore from a user.

11. The system of claim 1, wherein the operations for backing up a selected virtual volume further comprises taking a snapshot of the virtual volume; and wherein the virtual file is created through the use of the snapshot.

12. The system of claim 11, wherein each virtual volume is addressed by a Logical Block Address (LBA) which identifies each sector.

13. The system of claim 11, wherein each virtual file in the virtual file system comprises a block list.

14. The system of claim 13, wherein each virtual volume is divided into file blocks, and wherein the block list of the representing virtual file comprises the file blocks that contain data.

15. The system of claim 14, wherein each virtual file in the virtual file system further comprises a Block Allocation Table (BAT), wherein the BAT contains an offset for each file block contained in the file block list.

16. The system of claim 15, wherein the backup and restore operations are executed using NFS protocol.

17. The system of claim 16, further comprising a virtual file table, the virtual file table indicating a status of each virtual file in the virtual file system, the status selected from a group comprising of normal, backup, or restoring.

18. The system of claim 11, further comprising a management server and a backup server, wherein the management server receives requests for backup or restore from a user, and forwards the request to the backup server.

19. The system of claim 12, further comprising a virtual volume table, the virtual volume table comprising the LBA, allocation information of the LBA, and snapshot allocation information for each virtual volume in the plurality of virtual volumes.

20. The system of claim 19, further comprising an application server, wherein when the operations for backing up a selected virtual volume is executed, the application server is granted read and write access on the selected virtual volume if a snapshot of the selected virtual volume is maintained.

21. A method performed by a storage system comprising a storage system control module, one or more virtual volumes and a virtual file system; wherein each virtual volume is represented as a virtual file within the virtual file system, each virtual file representing data actually stored within the virtual volume; the method comprising performing operations for backing up a selected virtual volume, the operations for backing up a selected virtual volume comprising:

accessing the virtual file system on the storage system; and reading the virtual file corresponding to the selected virtual volume; and performing operations for restoring a selected virtual volume, the operations for restoring a selected virtual volume comprising:

accessing the virtual file system on the storage system; and creating a virtual file representing the selected virtual volume;

generate file image information for file image creation, the generating file image information comprising:

referring to virtual volume information comprising volume logical block address information and disk block allocation information;

generating, based on referring to the virtual volume information, an image of a file block header in the file image information determining an offset in the file image information for each file block based on the disk block allocation information; and generating header and footer image information for the file image information based on the determined offset in the file image information for the each file block; and reading the file image information and performing one of a create operation and a write operation to facilitate the operations for backing up the selected virtual volume.

* * * * *